US010539335B2

(12) United States Patent
Yasuo et al.

(10) Patent No.: US 10,539,335 B2
(45) Date of Patent: Jan. 21, 2020

(54) REGENERATIVE AIR CONDITIONER

(71) Applicant: DAIKIN INDUSTRIES, LTD., Osaka-shi, Osaka (JP)

(72) Inventors: Kouichi Yasuo, Osaka (JP); Shuuji Fujimoto, Osaka (JP); Kebi Chen, Osaka (JP); Takuya Nakao, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 113 days.

(21) Appl. No.: 15/535,529

(22) PCT Filed: Dec. 24, 2015

(86) PCT No.: PCT/JP2015/006449
§ 371 (c)(1),
(2) Date: Jun. 13, 2017

(87) PCT Pub. No.: WO2016/103711
PCT Pub. Date: Jun. 30, 2016

(65) Prior Publication Data
US 2017/0336085 A1 Nov. 23, 2017

(30) Foreign Application Priority Data
Dec. 26, 2014 (JP) ................. 2014-265594

(51) Int. Cl.
F24F 5/00 (2006.01)
F24F 11/89 (2018.01)
F25B 13/00 (2006.01)
F25B 41/04 (2006.01)
F25B 49/02 (2006.01)

(52) U.S. Cl.
CPC ............... F24F 5/001 (2013.01); F24F 5/00 (2013.01); F24F 5/0017 (2013.01); F24F 11/89 (2018.01);
(Continued)

(58) Field of Classification Search
CPC .... F24F 11/89; F24F 5/00; F24F 5/001; F24F 5/0017; F25B 13/00; F25B 2400/13;
(Continued)

(56) References Cited

U.S. PATENT DOCUMENTS 5,062,276 A * 11/1991 Dudley .................... F24F 11/00
62/176.6
5,299,431 A 4/1994 Iritani et al.
(Continued)

FOREIGN PATENT DOCUMENTS

| JP | 2007-17089 A | 1/2007 |
| JP | 2013-130357 A | 7/2013 |
| JP | 2014-129966 A | 7/2014 |

OTHER PUBLICATIONS

International Search Report, issued in PCT/JP2015/006449, PCT/ISA/210, dated Apr. 5, 2016.

Primary Examiner — Henry T Crenshaw
(74) Attorney, Agent, or Firm — Birch, Stewart, Kolasch & Birch, LLP

(57) ABSTRACT

To avoid decline in the efficiency of a compressor at a low load, the thermal storage air conditioner has an operation controller which, if a rotational speed of the compressor is slowed down to a predetermined lower reference value in a simple cooling operation, switches operation of the thermal storage air conditioner from the simple cooling operation to a cooling and cold thermal energy storage operation to increase the rotational speed of the compressor. During the simple cooling operation refrigerant is condensed in the outdoor heat exchanger and evaporates in the indoor heat exchanger, and during a cooling and cold thermal energy storage operation the refrigerant is condensed in the outdoor heat exchanger, evaporates in the indoor heat exchanger, and the thermal storage medium in the thermal storage section is cooled by the refrigerant.

4 Claims, 13 Drawing Sheets

(52) U.S. Cl.
CPC .............. *F25B 13/00* (2013.01); *F25B 41/04* (2013.01); *F25B 49/022* (2013.01); *F25B 2313/006* (2013.01); *F25B 2313/009* (2013.01); *F25B 2313/0232* (2013.01); *F25B 2313/0233* (2013.01); *F25B 2313/02731* (2013.01); *F25B 2400/13* (2013.01); *F25B 2400/24* (2013.01); *F25B 2600/0253* (2013.01); *Y02B 30/741* (2013.01)

(58) Field of Classification Search
CPC .......... F25B 2400/24; F25B 2600/0253; F25B 41/04; F25B 49/022; Y02B 30/741
USPC .......................................................... 62/207
See application file for complete search history.

(56) References Cited

U.S. PATENT DOCUMENTS

| | | | | |
|---|---|---|---|---|
| 5,735,133 A * | 4/1998 | Voss | ....................... | B60H 1/005 62/185 |
| 6,327,871 B1 * | 12/2001 | Rafalovich | ............... | F25B 5/04 62/267 |
| 2004/0237550 A1 * | 12/2004 | Yamasaki | ............... | F25B 9/008 62/228.1 |
| 2005/0172660 A1 * | 8/2005 | Anderson | ............. | F24F 5/0017 62/435 |
| 2007/0044951 A1 * | 3/2007 | Horn | .................. | B60H 1/00492 165/203 |
| 2008/0022683 A1 * | 1/2008 | Ohler | ........................ | F02C 6/14 60/641.8 |
| 2009/0266089 A1 * | 10/2009 | Haussmann | ........... | B60H 1/005 62/56 |
| 2011/0120673 A1 * | 5/2011 | Xiang | .................... | C09K 5/063 165/104.25 |
| 2012/0031119 A1 * | 2/2012 | Ahmad | ..................... | B64B 1/50 62/79 |
| 2014/0116673 A1 | 5/2014 | Kang et al. | | |
| 2016/0238265 A1 * | 8/2016 | Sherbeck | ............. | F16K 11/0833 |

* cited by examiner

REGENERATIVE AIR CONDITIONER

TECHNICAL FIELD

The present invention relates to a thermal storage air conditioner.

BACKGROUND ART

Air conditioners which cool and heat a room have been known. Patent document 1 discloses a thermal storage air conditioner using a thermal storage medium. The thermal storage air conditioner has a refrigerant circuit to which a compressor, an outdoor heat exchanger, and an indoor heat exchanger are connected, and a thermal storage section which exchanges heat between a refrigerant in the refrigerant circuit and the thermal storage medium.

This air conditioner selectively performs: general cooling and heating operations in which a room is air conditioned without utilizing thermal storage energy; a cold thermal energy storage operation in which the thermal storage medium is cooled to store cold thermal energy; a cold-thermal-energy-utilization cooling operation in which the cold thermal energy stored in the thermal storage medium is utilized to cool the room; and a thermal-energy-utilization heating operation in which warm thermal energy stored in the thermal storage medium is utilized to heat the room. During these operations, the compressor is actuated so that the refrigerant circulates in the refrigerant circuit, thereby performing a refrigeration cycle.

CITATION LIST

Patent Document

Patent Document 1: Japanese Unexamined Patent Publication No. 2007-17089

SUMMARY OF THE INVENTION

Technical Problem

In general, the air-conditioning capacity of an air conditioner is controlled by adjusting the rotational speed of a compressor. Thus, if the air-conditioning load (a cooling load or a heating load) in a room becomes smaller during operation of the air conditioner, the rotational speed of the compressor is reduced to decrease the air-conditioning capacity of the air conditioner according to the air-conditioning load in the room. If the air conditioner has an excessive air-conditioning capacity with respect to the air-conditioning load even after the rotational speed of the compressor is set to a minimum value, an on/off operation of the compressor, in which the halt and restart of the compressor are repeated, is performed to prevent the room temperature from becoming too low or too high.

In general, the efficiency of the compressor peaks at a certain rotational speed, and gradually decreases as the rotational speed is slowed down from the peak. Operation of the compressor at a relatively low rotational speed may therefore decline the operational efficiency of the air conditioner. Moreover, the on/off operation of the compressor at a low air-conditioning load may increase a range of variations of the room air temperature, and deteriorate the comfort of the room.

In view of the foregoing background, it is therefore an object of the present invention to reduce the decline of efficiency of an air conditioner and deterioration of the comfort of a room at a low air-conditioning load.

Solution to the Problem

A first aspect of the present disclosure is directed to a thermal storage air conditioner which includes: a refrigerant circuit (11) which has a compressor (22), an outdoor heat exchanger (23), and an indoor heat exchanger (72) and performs a refrigeration cycle; and a thermal storage section (60) which has a thermal storage medium and exchanges heat between the thermal storage medium and a refrigerant of the refrigerant circuit (11). The thermal storage air conditioner is capable of performing a simple cooling operation in which in the refrigerant circuit (11), the refrigerant is condensed in the outdoor heat exchanger (23) and evaporates in the indoor heat exchanger (72), and a cooling and cold thermal energy storage operation in which in the refrigerant circuit (11), the refrigerant is condensed in the outdoor heat exchanger (23) and evaporates in the indoor heat exchanger (72), and in which the thermal storage medium in the thermal storage section (60) is cooled by the refrigerant. The thermal storage air conditioner has an operation control section (100) which, if a rotational speed of the compressor (22) is slowed down to a predetermined lower reference value in the simple cooling operation, switches an operation of the thermal storage air conditioner from the simple cooling operation to the cooling and cold thermal energy storage operation to increase the rotational speed of the compressor (22).

In the first aspect, the operation is switched to the cooling and cold thermal energy storage operation if the rotational speed of the compressor (22) is slowed down and the efficiency of the compressor declines in the simple cooling operation, in order to increase the rotational speed of the compressor (22) and improve the efficiency of the compressor. Further, in the simple cooling operation, even if the load is lowered to an extent that requires an on/off operation, part of the cold thermal energy obtained through the refrigeration cycle is stored in the thermal storage section (60). Thus, the temperature of the cold thermal energy utilized to cool the air in the indoor heat exchanger (72) may be dropped to a value corresponding to the cooling load in the room without performing the on/off operation.

A second aspect of the present disclosure is an embodiment of the first aspect. In the second aspect, the operation control section (100) switches the operation of the thermal storage air conditioner from the cooling and cold thermal energy storage operation to the simple cooling operation to reduce the rotational speed of the compressor (22) if the rotational speed of the compressor (22) increases to a predetermined upper reference value in the cooling and cold thermal energy storage operation.

The efficiency of the compressor declines also in a case where the rotational speed is too high. Therefore, in the second aspect, if the rotational speed of the compressor (22) reaches a predetermined upper reference value in the cooling and cold thermal energy storage operation, the operation is switched to the simple cooling operation to reduce the rotational speed of the compressor (22). As a result, the compressor may be actuated at a highly efficient rotational speed, thereby making it possible to keep the efficiency of the air conditioner high.

A third aspect of the present disclosure is an embodiment of the first or second aspect. In the third aspect, when the operation control section (100) switches the operation of the thermal storage air conditioner from the simple cooling operation to the cooling and cold thermal energy storage operation, the rotational speed of the compressor (22) is increased by a value equal to a lowest rotational speed of the compressor (22).

In the third aspect, when the operation of the thermal storage air conditioner is switched from the simple cooling operation to the cooling and cold thermal energy storage operation, the rotational speed of the compressor is increased by a value equal to a lowest rotational speed of the compressor.

A fourth aspect of the present disclosure is directed to a thermal storage air conditioner which includes: a refrigerant circuit (11) which has a compressor (22), an outdoor heat exchanger (23), and an indoor heat exchanger (72) and performs a refrigeration cycle; and a thermal storage section (60) which has a thermal storage medium and exchanges heat between the thermal storage medium and a refrigerant of the refrigerant circuit (11). The thermal storage air conditioner is capable of performing a simple heating operation in which in the refrigerant circuit (11), the refrigerant is condensed in the indoor heat exchanger (72) and evaporates in the outdoor heat exchanger (23), and a heating and warm thermal energy storage operation in which in the refrigerant circuit (11), the refrigerant is condensed in the in the indoor heat exchanger (72) and evaporates in the outdoor heat exchanger (23), and in which the thermal storage medium in the thermal storage section (60) is heated by the refrigerant. The thermal storage air conditioner has an operation control section (100) which, if a rotational speed of the compressor (22) is slowed down to a predetermined lower reference value in the simple heating operation, switches an operation of the thermal storage air conditioner from the simple heating operation to the heating and warm thermal energy storage operation to increase the rotational speed of the compressor (22).

In the fourth aspect, the operation is switched to the heating and warm thermal energy storage operation if the rotational speed of the compressor (22) is slowed down and the efficiency of the compressor declines in the simple heating operation, in order to increase the rotational speed of the compressor (22) and improve the efficiency of the compressor. Further, in the simple heating operation, even if the load is lowered to an extent that requires an on/off operation, part of the warm thermal energy obtained through the refrigeration cycle is stored in the thermal storage section (60). Thus, the temperature of the warm thermal energy utilized to heat the air in the indoor heat exchanger (72) may be dropped to a value corresponding to the heating load in the room without performing the on/off operation of the compressor.

A fifth aspect of the present disclosure is an embodiment of the fourth aspect. In the fifth aspect, the operation control section (100) switches the operation of the thermal storage air conditioner from the heating and warm thermal energy storage operation to the simple heating operation to reduce the rotational speed of the compressor (22) if the rotational speed of the compressor (22) increases to a predetermined upper reference value in the heating and warm thermal energy storage operation.

The efficiency of the compressor declines also in a case where the rotational speed is too high. Therefore, in the fifth aspect, if the rotational speed of the compressor (22) reaches a predetermined upper reference value in the heating and warm thermal energy storage operation, the operation is switched to the simple heating operation to reduce the rotational speed of the compressor (22). As a result, the compressor may be actuated at a highly efficient rotational speed, thereby making it possible to keep the efficiency of the air conditioner high.

A sixth aspect of the present disclosure is an embodiment of the fourth or fifth aspect. In the sixth aspect, when the operation control section (100) switches the operation of the thermal storage air conditioner from the simple heating operation to the heating and warm thermal energy storage operation, the rotational speed of the compressor (22) is increased by a value equal to a lowest rotational speed of the compressor (22).

In the sixth aspect, when the operation of the thermal storage air conditioner is switched from the simple heating operation to the heating and warm thermal energy storage operation, the rotational speed of the compressor is increased by a value equal to a lowest rotational speed of the compressor.

Advantages of the Invention

According to the first aspect, if the rotational speed of the compressor (22) is slowed down, the operation is switched from the simple cooling operation to the cooling and cold thermal energy storage operation to increase the rotational speed of the compressor (22). As a result, it is possible to reduce the decline in the efficiency of the compressor (22), and further improve the efficiency of the thermal storage air conditioner as a whole. Further, since the on/off operations of the compressor (22) are not necessary, it is possible to reduce variations in the temperature of the indoor air and keep the comfort of the room, and reduce the power required to start up the compressor (22), as well as the power consumption.

According to the second aspect, if the rotational speed of the compressor (22) increases, the operation is switched from the cooling and cold thermal energy storage operation to the simple cooling operation to slow down the rotational speed of the compressor (22). As a result, it is possible to reduce the decline in the efficiency of the compressor (22).

According to the fourth aspect, if the rotational speed of the compressor (22) is slowed down, the operation is switched from the simple heating operation to the heating and warm thermal energy storage operation to increase the rotational speed of the compressor (22). As a result, it is possible to reduce the decline in the efficiency of the compressor (22). Further, since the on/off operations of the compressor (22) are not necessary, it is possible to reduce variations in the temperature of the indoor air and keep the comfort of the room, and reduce the power required to start up the compressor (22), as well as the power consumption.

According to the fifth aspect, if the rotational speed of the compressor (22) increases, the operation is switched from the heating and warm thermal energy storage operation to the simple heating operation to slow down the rotational speed of the compressor (22). As a result, it is possible to reduce the decline in the efficiency of the compressor (22).

DESCRIPTION OF EMBODIMENTS

Embodiments of the present invention will be described in detail below with reference to the drawings. The following embodiments are merely exemplary ones in nature, and are not intended to limit the scope, applications, or use of the invention.

A thermal storage air conditioner (10) according to an embodiment of the present invention selectively performs cooling and heating of a room. The thermal storage air conditioner (10) stores cold thermal energy of a refrigerant in a thermal storage medium, and utilizes this cold thermal energy for cooling. The thermal storage air conditioner (10) stores warm thermal energy of the refrigerant in the thermal storage medium, and utilizes this warm thermal energy for heating.

<General Configuration>

Figure 1:
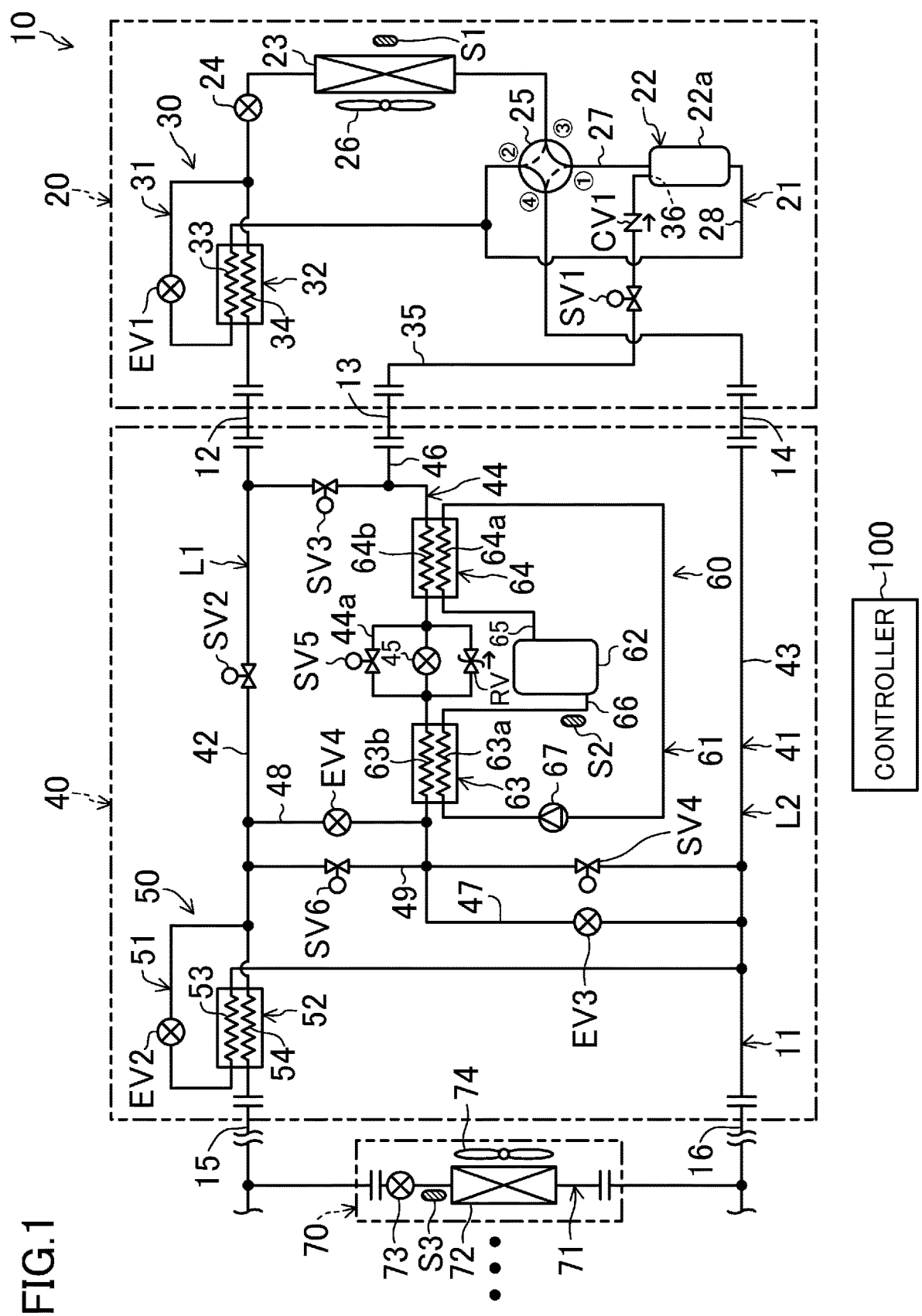
FIG. 1 is a piping diagram generally illustrating a configuration of a thermal storage air conditioner according to an embodiment of the present disclosure.

As illustrated in FIG. 1, the thermal storage air conditioner (10) is comprised of an outdoor unit (20), a thermal storage unit (40), and a plurality of indoor units (70). The outdoor unit (20) and the thermal storage unit (40) are installed outside of a room. The plurality of indoor units (70) are installed in the room. For the sake of convenience, only one indoor unit (70) is illustrated in FIG. 1.

The outdoor unit (20) includes an outdoor circuit (21). The thermal storage unit (40) includes an intermediate circuit (41). The indoor unit (70) includes an indoor circuit (71). In the thermal storage air conditioner (10), the outdoor circuit (21) and the intermediate circuit (41) are connected to each other via three communication pipes (12, 13, 14), and the intermediate circuit (41) and the plurality of indoor circuits (71) are connected to each other via two communication pipes (15, 16). Thus, the thermal storage air conditioner (10) forms a refrigerant circuit (11) in which a refrigerant filling the thermal storage air conditioner (10) circulates to perform a refrigeration cycle. The thermal storage air conditioner (10) has a controller (100) (an operation control section) which controls various devices which will be described later.

<Outdoor Unit>

The outdoor unit (20) includes an outdoor circuit (21) which forms part of the refrigerant circuit (11). A compressor (22), an outdoor heat exchanger (23), an outdoor expansion valve (24), and a four-way switching valve (25) are connected to the outdoor circuit (21). A first subcooling circuit (30) and an intermediate suction pipe (35) are connected to the outdoor circuit (21).

[Compressor]

The compressor (22) of the present embodiment is a single-stage compressor, and forms a compression section which compresses the refrigerant and discharges the compressed refrigerant. The compressor (22) has a casing (22*a*), in which a motor and a compression mechanism (not shown) are housed. The compression mechanism of the present embodiment is configured as a scroll compression mechanism. However, the compression mechanism may be any one of various types such as oscillating piston, rolling piston, screw, and turbo compressors. The compression mechanism includes a compression chamber between a spiral-shaped fixed scroll and a movable scroll. The refrigerant is compressed as the capacity of the compression chamber gradually decreases. The motor of the compressor (22) has a variable operating frequency which is varied by an inverter section. That is, the compressor (22) is an inverter compressor, the rotational frequency (i.e., the capacity) of which is variable.

[Outdoor Heat Exchanger]

The outdoor heat exchanger (23) is configured as a cross-fin-and-tube heat exchanger, for example. An outdoor fan (26) is provided adjacent to the outdoor heat exchanger (23). The outdoor heat exchanger (23) exchanges heat between the air transferred by the outdoor fan (26) and the refrigerant flowing through the outdoor heat exchanger (23). An outside-air temperature sensor (S1), which detects a temperature of outdoor air, is provided adjacent to the outdoor heat exchanger (23). For the sake of convenience, the outside-air temperature sensor (S1) is shown in only FIG. 1 and omitted in the other drawings.

[Outdoor Expansion Valve]

The outdoor expansion valve (24) is arranged between a liquid-side end of the outdoor heat exchanger (23) and a connection end of the communication pipe (12). The outdoor expansion valve (24) is configured, for example, as an electronic expansion valve, and adjusts the flow rate of the refrigerant by changing the degree of opening of the valve.

[Four-Way Switching Valve]

The four-way switching valve (25) has first to fourth ports. The first port of the four-way switching valve (25) is connected to the discharge pipe (27) of the compressor (22). The second port of the four-way switching valve (25) is connected to a suction pipe (28) (a low-pressure suction portion) of the compressor (22). The third port of the four-way switching valve (25) is connected to a gas-side end of the outdoor heat exchanger (22). The fourth port of the four-way switching valve (25) is connected to a connection end of the communication pipe (14).

The four-way switching valve (25) is configured to switch between a state in which the first port and the third port communicate with each other and the second port and the fourth port communicate with each other (i.e., a first state indicated by solid lines in FIG. 1) and a state in which the first port and the fourth port communicate with each other and the second port and the third port communicate with each other (i.e., a second state indicated by broken lines in FIG. 1).

[First Subcooling Circuit]

The first subcooling circuit (30) includes a first introduction pipe (31) and a first subcooling heat exchanger (32). One end of the introduction pipe (31) is connected between the outdoor expansion valve (24) and the connection end of the communication pipe (12). The other end of the first introduction pipe (31) is connected to the suction pipe (28) of the compressor (22). In other words, the first introduction pipe (31) forms a low-pressure introduction pipe connecting a liquid line (L1) and the suction pipe (28) on the low-pressure side of the compressor (22). Here, the liquid line (L1) is a channel extending between the liquid-side end of the outdoor heat exchanger (23) and a liquid-side end of the indoor heat exchanger (72). A first decompression valve (EV1) and a first heat transfer channel (33) are connected to the first introduction pipe (31) sequentially from one end to the other end of the first introduction pipe (31). The first decompression valve (EV1) is configured, for example, as an electronic expansion valve, and adjusts the degree of subcooling of the refrigerant at the exit of the second heat transfer channel (34) by changing the degree of opening of the valve. The first subcooling heat exchanger (32) forms a first heat exchanger which exchanges heat between the refrigerant flowing through the second heat transfer channel (34) and the refrigerant flowing through the first heat transfer channel (33). The second heat transfer channel (34) is provided between the outdoor expansion valve (24) and the connection end of the communication pipe (12), of the liquid line (L1) of the refrigerant circuit (11).

[Intermediate Suction Pipe]

The intermediate suction pipe (35) forms an intermediate suction portion which introduces a refrigerant with an intermediate pressure to the compression chamber of the compressor (22) in the middle of compression. The starting end of the intermediate suction pipe (35) is connected to the connection end of the communication pipe (13), and the terminal end of the intermediate suction pipe (35) is connected to the compression chamber of the compression mechanism of the compressor (22). The intermediate suction pipe (35) includes an inner pipe portion (36) located inside the casing (22a) of the compressor (22). The internal pressure of the intermediate suction pipe (35) basically corresponds to an intermediate pressure between the high and low pressures of the refrigerant circuit (11). A first solenoid valve (SV1) and a check valve (CV1) are connected to the intermediate suction pipe (35) sequentially from the upstream to downstream side. The first solenoid valve (SV1) is an open/close valve for opening and closing the channel. The check valve (CV1) allows the refrigerant to flow in a direction (the arrow direction in FIG. 1) from a primary thermal storage channel (44) (which will be described in detail later) toward the compressor (22), and prohibits the refrigerant from flowing in a direction from the compressor (22) toward the primary thermal storage channel (44).

<Thermal Storage Unit>

The thermal storage unit (40) forms a junction unit which intervenes between the outdoor unit (20) and the indoor unit (70). The thermal storage unit (40) includes an intermediate circuit (41) which forms part of the refrigerant circuit (11). A primary liquid pipe (42), a primary gas pipe (43), and the primary thermal storage channel (44) are connected to the intermediate circuit (41). A second subcooling circuit (50) is connected to the intermediate circuit (41). The thermal storage unit (40) includes a thermal storage device (60).

[Primary Liquid Pipe]

The primary liquid pipe (42) forms part of the liquid line (L1). The primary liquid pipe (42) connects a connection end of the communication pipe (12) and a connection end of the communication pipe (15). A second solenoid valve (SV2) is connected to the primary liquid pipe (42). The second solenoid valve (SV2) is an open/close valve for opening and closing the channel.

[Primary Gas Pipe]

The primary gas pipe (43) forms part of a gas line (L2). Here, the gas line (L2) is a channel extending between the fourth port of the four-way switching valve (25) and a gas-side end of the indoor heat exchanger (72). The primary gas pipe (43) connects a connection end of the communication pipe (14) and a connection end of the communication pipe (16).

[Primary Thermal Storage Channel]

The primary thermal storage channel (44) is connected between the primary liquid pipe (42) and the primary gas pipe (43). One end of the primary thermal storage channel (44) is connected between the connection end of the communication pipe (12) and the second solenoid valve (SV2). A third solenoid valve (SV3), a preheating refrigerant channel (64b), a thermal storage expansion valve (45), a thermal storage refrigerant channel (63b), and a fourth solenoid valve (SV4) are connected to the primary thermal storage channel (44) sequentially in a direction from the primary liquid pipe (42) to the primary gas pipe (43). The third solenoid valve (SV3) and the fourth solenoid valve (SV4) are open/close valves for opening and closing the channels. The thermal storage expansion valve (45) is configured, for example, as an electronic expansion valve, and adjusts the pressure of the refrigerant by changing the degree of opening of the valve.

A first bypass pipe (44a) which bypasses the thermal storage expansion valve (45) is connected to the primary thermal storage channel (44). A fifth solenoid valve (SV5) is connected to the first bypass pipe (44a) in parallel with the thermal storage expansion valve (45). The fifth solenoid valve (SV5) is an open/close valve for opening and closing the channel. A pressure release valve (RV) is connected to the primary thermal storage channel (44) in parallel with the thermal storage expansion valve (45).

[Second Subcooling Circuit]

The second subcooling circuit (50) includes a second introduction pipe (51) and a second subcooling heat exchanger (52). One end of the second introduction pipe (51) is connected between the second solenoid valve (SV2) and a connection end of the communication pipe (15). The other end of the second introduction pipe (51) is connected to the primary gas pipe (43). The second introduction pipe (51) is connected to the primary gas pipe (43) between the junction of the primary thermal storage channel (44) with the primary gas pipe (43) and the connection end of the communication pipe (16). A second decompression valve (EV2) and a third heat transfer channel (53) are connected to the second introduction pipe (51) sequentially from one end to the other end of the second introduction pipe (51). The second decompression valve (EV2) is configured, for example, as an electronic expansion valve, and adjusts a degree of subcooling of the refrigerant at the exit of the fourth heat transfer channel (54) by changing the degree of opening of the valve. The second subcooling heat exchanger (52) exchanges heat between the refrigerant flowing through the fourth heat transfer channel (54) and the refrigerant flowing through the third heat transfer channel (53). The fourth heat transfer channel (54) is provided at a portion between the second solenoid valve (SV2) and the connection end of the communication pipe (15), of the primary liquid pipe (42). The second subcooling circuit (50) forms a subcooler which prevents the refrigerant flowing through the communication pipe (15) from vaporizing and being flushed in a utilization and cooling operation and a utilization and cold thermal energy storage operation, which will be described in detail later.

[Other Pipes]

An intermediate junction pipe (46), a first branch pipe (47), a second branch pipe (48), and a third branch pipe (49) are connected to the intermediate circuit (41). One end of the intermediate junction pipe (46) is connected at a portion of the primary thermal storage channel (44) between the third solenoid valve (SV3) and the preheating refrigerant channel (64b). The other end of the intermediate junction pipe (46) is connected to the intermediate suction pipe (35) via the communication pipe (13). One end of the first branch pipe (47) is connected to a portion of the primary thermal storage channel (44) between the thermal storage refrigerant channel (63b) and the fourth solenoid valve (SV4).

The other end of the first branch pipe (47) is connected to the primary gas pipe (43) between the junction of the primary thermal storage channel (44) with the primary gas pipe (43) and junction of the second introduction pipe (51) with the primary gas pipe (43). The third decompression valve (EV3) is connected to the first branch pipe (47). The third decompression valve (EV3) is configured, for example, as an electronic expansion valve, and adjusts the pressure of the refrigerant by changing the degree of opening of the valve. The degree of opening of the third decompression valve (EV3) is adjusted to prevent the pressure of the thermal storage heat exchanger (63) from becoming excessively low due to a difference between an evaporating pressure in the indoor heat exchanger (72) and a pressure in the primary gas pipe (43) caused by a pressure loss of the communication pipe (16) and/or a head difference depending on installation conditions of the indoor unit (70) and the outdoor unit (20), in an operation in which the indoor heat exchanger (72) serves as an evaporator.

The second branch pipe (48) and the third branch pipe (49) are connected to the primary liquid pipe (42) and the primary thermal storage channel (44) in parallel with each other. One end of the second branch pipe (48) and one end of the third branch pipe (49) are connected to portions of the primary thermal storage channel (44) between the thermal storage refrigerant channel (63b) and the fourth solenoid valve (SV4). The other end of the second branch pipe (48) and the other end of the third branch pipe (49) are connected to portions of the primary liquid pipe (42) between the second solenoid valve (SV2) and the junction of the second introduction pipe (51) with the primary liquid pipe (42). The fourth decompression valve (EV4) is connected to the second branch pipe (48). The fourth decompression valve (EV4) is configured, for example, as an electronic expansion valve, and adjusts the pressure of the refrigerant by changing the degree of opening of the valve. A sixth solenoid valve (SV6) is connected to the third branch pipe (49). The sixth solenoid valve (SV6) is an open/close valve for opening and closing the channel.

[Thermal Storage Device]

The thermal storage device (60) forms a thermal storage section in which heat is exchanged between the refrigerant of the refrigerant circuit (11) and the thermal storage medium. The thermal storage device (60) has a thermal storage circuit (61) and a thermal storage tank (62) connected to the thermal storage circuit (61). The thermal storage device (60) has the thermal storage heat exchanger (63) and the preheating heat exchanger (64).

The thermal storage circuit (61) is a closed circuit in which the thermal storage medium filling the thermal storage circuit (61) circulates. The thermal storage tank (62) is a hollow cylindrical vessel. The thermal storage tank (62) may be an open vessel. The thermal storage medium is accumulated in the thermal storage tank (62). An outflow pipe (65) (an outflow portion) is connected to an upper portion of the thermal storage tank (62) to allow the thermal storage medium in the thermal storage tank (62) to flow out of the tank. An inflow pipe (66) (an inflow portion) is connected to a lower portion of the thermal storage tank (62) to allow the thermal storage medium present outside the thermal storage tank (62) to flow into the thermal storage tank (62). In other words, in the thermal storage tank (62), the junction of the outflow pipe (65) is located higher than the junction of the inflow pipe (66). A preheating-side thermal storage channel (64a), a pump (67), and a thermal storage-side thermal storage channel (63a) are connected to the thermal storage circuit (61) sequentially from the outflow pipe (65) toward the inflow pipe (66).

The preheating heat exchanger (64) is configured to exchange heat between the thermal storage medium flowing through the preheating-side thermal storage channel (64a) and the refrigerant flowing through the preheating refrigerant channel (64b). The thermal storage heat exchanger (63) is configured to exchange heat between the thermal storage medium flowing through the thermal storage-side thermal storage channel (63a) and the refrigerant flowing through the thermal storage refrigerant channel (63b). The pump (67) is configured to circulate the thermal storage medium in the thermal storage circuit (61).

The thermal storage circuit (61) is provided with a thermal storage medium temperature sensor (S2) (a thermal storage medium temperature detector) at a channel between the thermal storage heat exchanger (63) and the thermal storage tank (62). Specifically, the thermal storage medium temperature sensor (S2) is located at a position where the temperature of the thermal storage medium in the inflow pipe (66) is detected. The thermal storage medium temperature sensor (S2) also serves as an accumulation detector which detects a start of accumulation of crystals of clathrate hydrates in the thermal storage circuit (61). The position of the thermal storage medium temperature sensor (S2) is a non-limiting example, and the sensor (S2) may also be located at a different position of the thermal storage circuit (61). For the sake of convenience, the thermal storage medium temperature sensor (S2) is shown in only FIG. 1 and omitted in the other drawings.

[Thermal Storage Medium]

Now, the thermal storage medium filling the thermal storage circuit (61) will be described in detail. A thermal storage material in which clathrate hydrates are generated when cooled, that is, a thermal storage material having flowability, is adopted as the thermal storage medium. Examples of the thermal storage medium include a tetra-n-butyl ammonium bromide (TBAB) aqueous solution containing tetra-n-butyl ammonium bromide, a trimethylolethane (TME) aqueous solution, and paraffin-based slurry. For example, the state as an aqueous solution of a tetra-n-butyl ammonium bromide aqueous solution is maintained even if it is cooled in a stable manner and turns into a subcooled state in which the temperature of the aqueous solution is lower than a temperature at which hydrates are generated. However, once some trigger is given in this subcooled state, the subcooled solution transitions to a solution containing clathrate hydrates (i.e., transitions to slurry). That is, the subcooled state of the tetra-n-butyl ammonium bromide aqueous solution is changed to the state of slurry with relatively high viscosity due to the generation of clathrate hydrates (hydrate crystals) made of tetra-n-butyl ammonium bromide and water molecules. The subcooled state as used herein refers to a state in which clathrate hydrates are not generated and the state of the solution is maintained even when the thermal storage medium reaches a temperature lower than or equal to the temperature at which hydrates are generated. On the other hand, the tetra-n-butyl ammonium bromide aqueous solution in the state of slurry is changed to the state of liquid (i.e., a solution) with relatively high flowability due to melting of the clathrate hydrates, if the temperature of the aqueous solution becomes higher, by heating, than the temperature at which the hydrates are generated.

In the present embodiment, a tetra-n-butyl ammonium bromide aqueous solution containing tetra-n-butyl ammonium bromide is adopted as the thermal storage medium. In particular, it is recommended that the thermal storage medium has a concentration close to a harmonic concentration. In the present embodiment, the harmonic concentration is set to about 40%. In this case, the temperature at which hydrates are generated in the tetra-n-butyl ammonium bromide aqueous solution is about 12° C.

<Indoor Unit>

Each of the plurality of indoor units (70) includes the indoor circuit (71) which forms part of the refrigerant circuit (11). The plurality of indoor circuits (71) are connected in parallel with each other between the communication pipe (15) (a liquid pipe) and the communication pipe (16) (a gas pipe). The plurality of indoor circuits (71) and the above-described primary thermal storage channel (44) are connected in parallel with one another between the liquid line (L1) and the gas line (L2). The indoor heat exchanger (72) and the indoor expansion valve (73) are connected to each indoor circuit (71) sequentially from the gas-side end toward the liquid-side end.

[Indoor Heat Exchanger]

The indoor heat exchanger (72) is configured, for example, as a cross-fin-and-tube heat exchanger. An indoor fan (74) is provided adjacent to the indoor heat exchanger (72). The indoor heat exchanger (72) exchanges heat between the air transferred by the indoor fan (74) and the refrigerant flowing through the outdoor heat exchanger (23).

The indoor circuit (71) is provided with a refrigerant temperature sensor (S3) at the liquid-side end of the indoor heat exchanger (72). The refrigerant temperature sensor (S3) is used to determine whether conditions indicating that the refrigerant that has been condensed by the indoor heat exchanger (72) has a high temperature, or conditions indicating that said refrigerant has a low temperature, are established or not, in a simple heating operation, which will be described in detail later. As a sensor used for this determination, an air temperature detection sensor which detects a temperature of flowing-out air after being heat-exchanged with the refrigerant in the indoor heat exchanger (72) may also be used. For the sake of convenience, the refrigerant temperature sensor (S3) is shown in only FIG. 1 and omitted in the other drawings.

[Indoor Expansion Valve]

The indoor expansion valve (73) is arranged between a liquid-side end of the indoor heat exchanger (72) and the connection end of the communication pipe (15). The indoor expansion valve (73) is configured, for example, as an electronic expansion valve, and adjusts the flow rate of the refrigerant by changing the degree of opening of the valve.

<Controller>

The controller (100) serves as an operation control section which controls various devices. Specifically, the controller (100) switches between ON and OFF states of the compressor (22), switches between the states of the four-way switching valve (25), switches between opening and closing of each of the solenoid valves (SV1-SV6), adjusts the degree of opening of each of the expansion valves (24, 45, 73) and the decompression valves (EV1-EV4), switches between ON and OFF states of the fans (26, 74), switches between ON and OFF states of the pump (67), etc. The thermal storage air conditioner (10) is further provided with various types of sensors not shown. The controller (100) controls the various devices, based on values detected by these sensors.

<Operation of Thermal Storage Air Conditioner>

Operations of the thermal storage air conditioner (10) according to the present embodiment will be described. The thermal storage air conditioner (10) selectively performs a simple cooling operation, a cold thermal energy storage operation, a utilization cooling operation, a cooling and cold thermal energy storage operation, a simple heating operation, a warm thermal energy storage operation, a heating and warm thermal energy storage operation, and a utilization heating operation. The controller (100) controls various devices to switch between these operations.

[Simple Cooling Operation]

Figure 2:
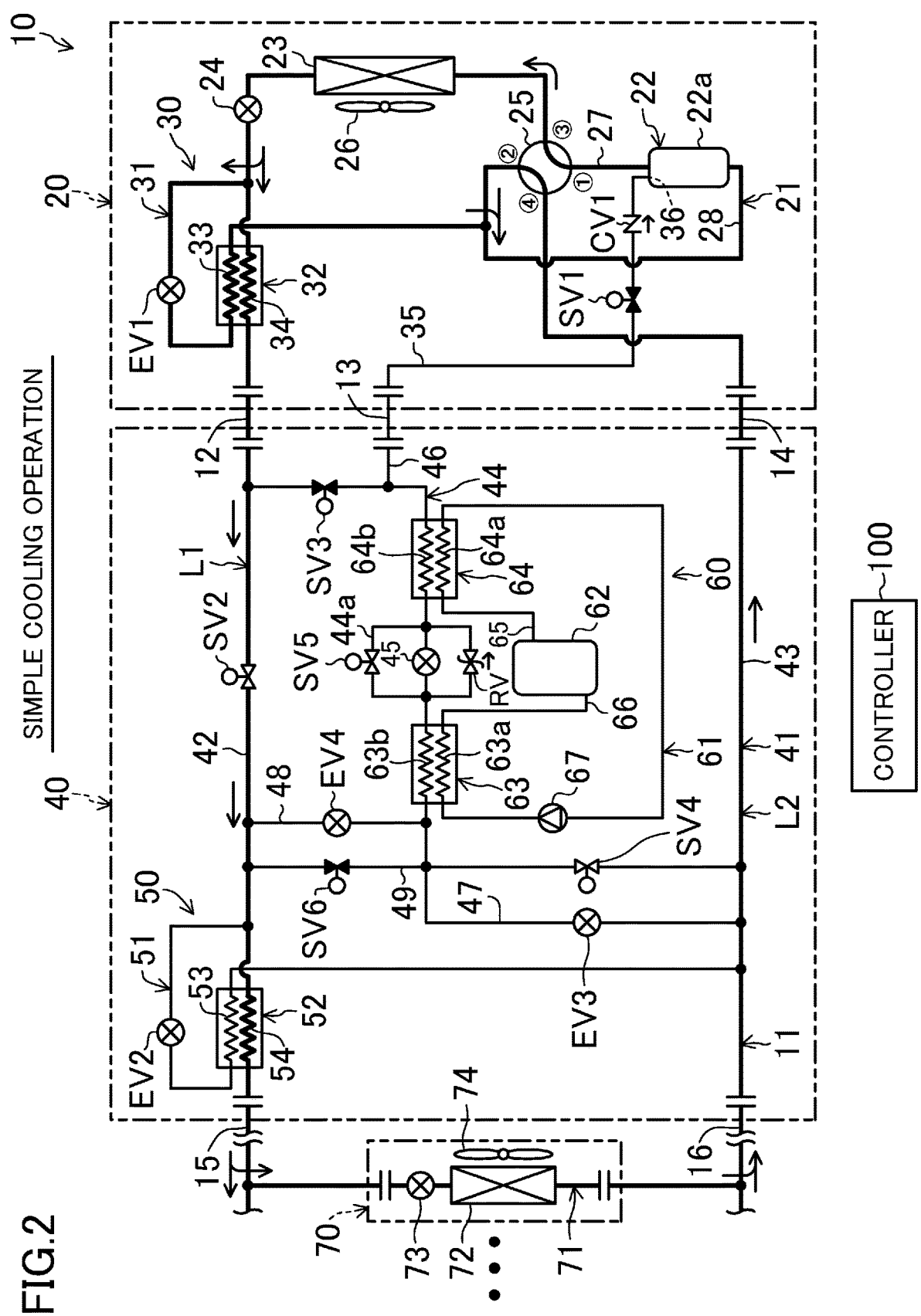
FIG. 2 is a view corresponding to FIG. 1 illustrating the behavior of a simple cooling operation.

In the simple cooling operation, the thermal storage device (60) is stopped, and the indoor unit (70) cools a room. In the simple cooling operation illustrated in FIG. 2, the four-way switching valve (25) is in the first state, and the second solenoid valve (SV2), the fourth solenoid valve (SV4), and the fifth solenoid valve (SV5) among the first to sixth solenoid valves (SV1-SV6) are open. The rest of the solenoid valves are closed. The second decompression valve (EV2) and the fourth decompression valve (EV4) are fully closed. The outdoor expansion valve (24) is fully open. The degrees of opening of the first decompression valve (EV1) and the indoor expansion valve (73) are appropriately adjusted. The compressor (22), the outdoor fan (26), and the indoor fan (74) are actuated. The thermal storage device (60) is not actuated since the pump (67) is stopped. In the simple cooling operation, the refrigerant circuit (11) performs a refrigeration cycle in which the outdoor heat exchanger (23) serves as a condenser, the first subcooling heat exchanger (32) as a subcooler, and the indoor heat exchanger (72) as an evaporator. In the simple cooling operation, the low-pressure gas line (L2) and the primary thermal storage channel (44) communicate with each other. Liquid accumulation in the primary thermal storage channel (44) may thus be prevented.

The refrigerant discharged from the compressor (22) is condensed by the outdoor heat exchanger (23). A large part of the condensed refrigerant flows through the second heat transfer channel (34), and the rest of the condensed refrigerant is decompressed by the first decompression valve (EV1) and then flows through the first heat transfer channel (33). In the first subcooling heat exchanger (32), the refrigerant in the second heat transfer channel (34) is cooled by the refrigerant in the first heat transfer channel (33). The refrigerant which has flowed into the liquid line (L1) is decompressed by the indoor expansion valve (73), and then evaporates in the indoor heat exchanger (72). The refrigerant flowing through the gas line (L2) merges with the refrigerant which has flowed into the first introduction pipe (31), and is taken into the compressor (22).

[Cold Thermal Energy Storage Operation]

Figure 3:
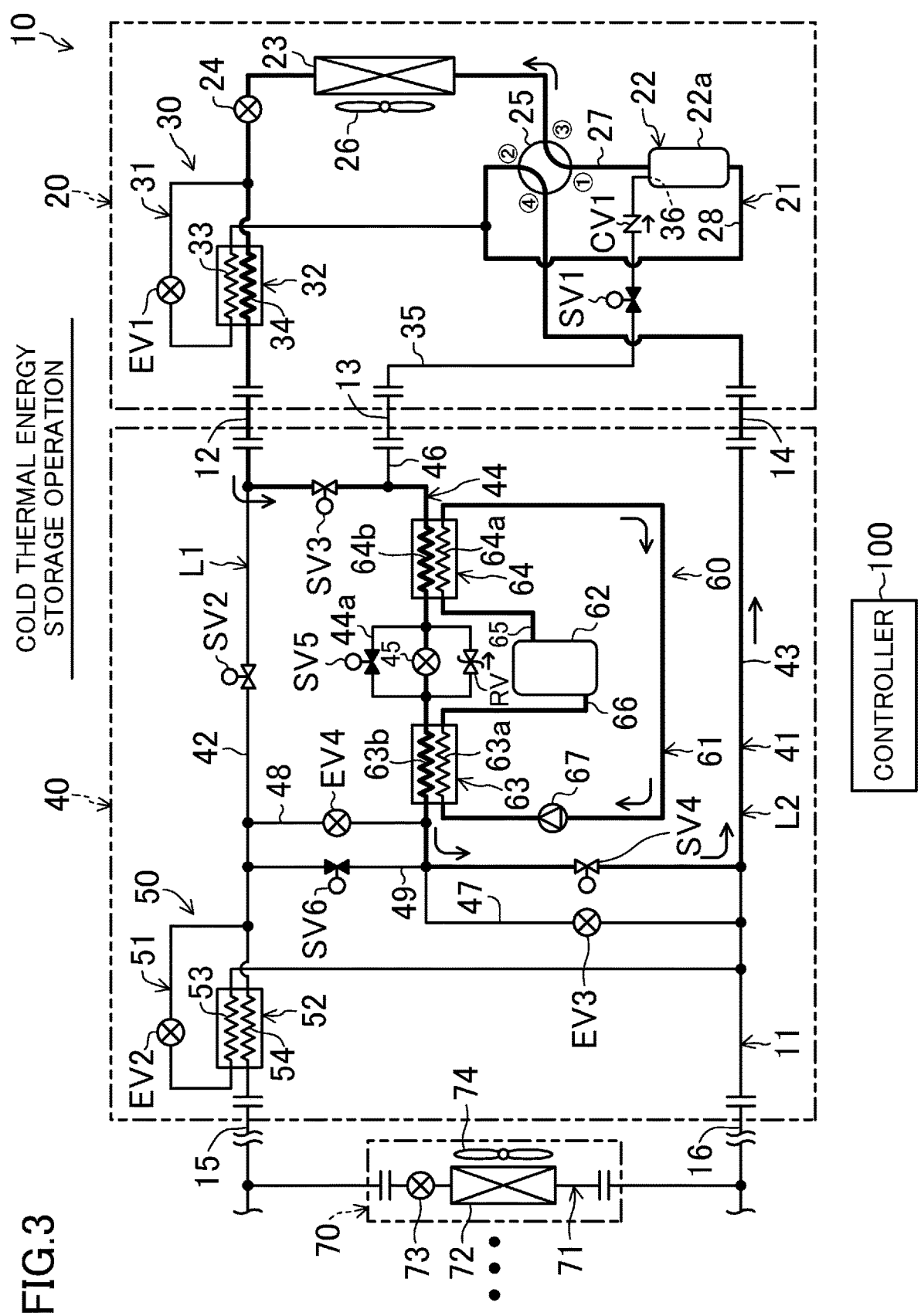
FIG. 3 is a view corresponding to FIG. 1 illustrating the behavior of a cold thermal energy storage operation.

In the cold thermal energy storage operation, the thermal storage device (60) is actuated to store cold thermal energy in the thermal storage medium in the thermal storage tank (62). In the cold thermal energy storage operation illustrated in FIG. 3, the four-way switching valve (25) is in the first state, and the second solenoid valve (SV2), the third solenoid valve (SV3), and the fourth solenoid valve (SV4) among the first to sixth solenoid valves (SV1-SV6) are open. The rest of the solenoid valves are closed. The first to fourth decompression valves (EV1-EV4) are fully closed. The outdoor expansion valve (24) is fully open. The degree of opening of the thermal storage expansion valve (45) is appropriately adjusted. The compressor (22) and the outdoor fan (26) are actuated, and the indoor fan (74) is stopped. The thermal storage device (60) is actuated since the pump (67) is in operation. In the cold thermal energy storage operation, the refrigerant circuit (11) performs a refrigeration cycle in which the outdoor heat exchanger (23) serves as a condenser, the preheating heat exchanger (64) as a radiator (a refrigerant cooler), and the thermal storage heat exchanger (63) as an evaporator. In the cold thermal energy storage operation, a surplus refrigerant may be held in the channel extending from the high-pressure liquid line (L1) to the indoor unit (70).

The refrigerant discharged from the compressor (22) is condensed by the outdoor heat exchanger (23). The condensed refrigerant flows through the preheating refrigerant channel (64b) of the primary thermal storage channel (44). In the preheating heat exchanger (64), the thermal storage medium is heated by the refrigerant. Cores (fine crystals) of the clathrate hydrates which have flowed out of the thermal storage tank (62) are thus melted. The refrigerant cooled in the preheating refrigerant channel (64b) is decompressed by the preheating heat exchanger (64), and then flows through the thermal storage refrigerant channel (63b). In the thermal storage heat exchanger (63), the thermal storage medium is cooled by the refrigerant and evaporates. The refrigerant which has flowed into the gas line (L2) from the primary thermal storage channel (44) is taken into the compressor (22). The thermal storage medium cooled by the thermal storage heat exchanger (63) is accumulated in the thermal storage tank (62).

[Utilization Cooling Operation]

Figure 4:
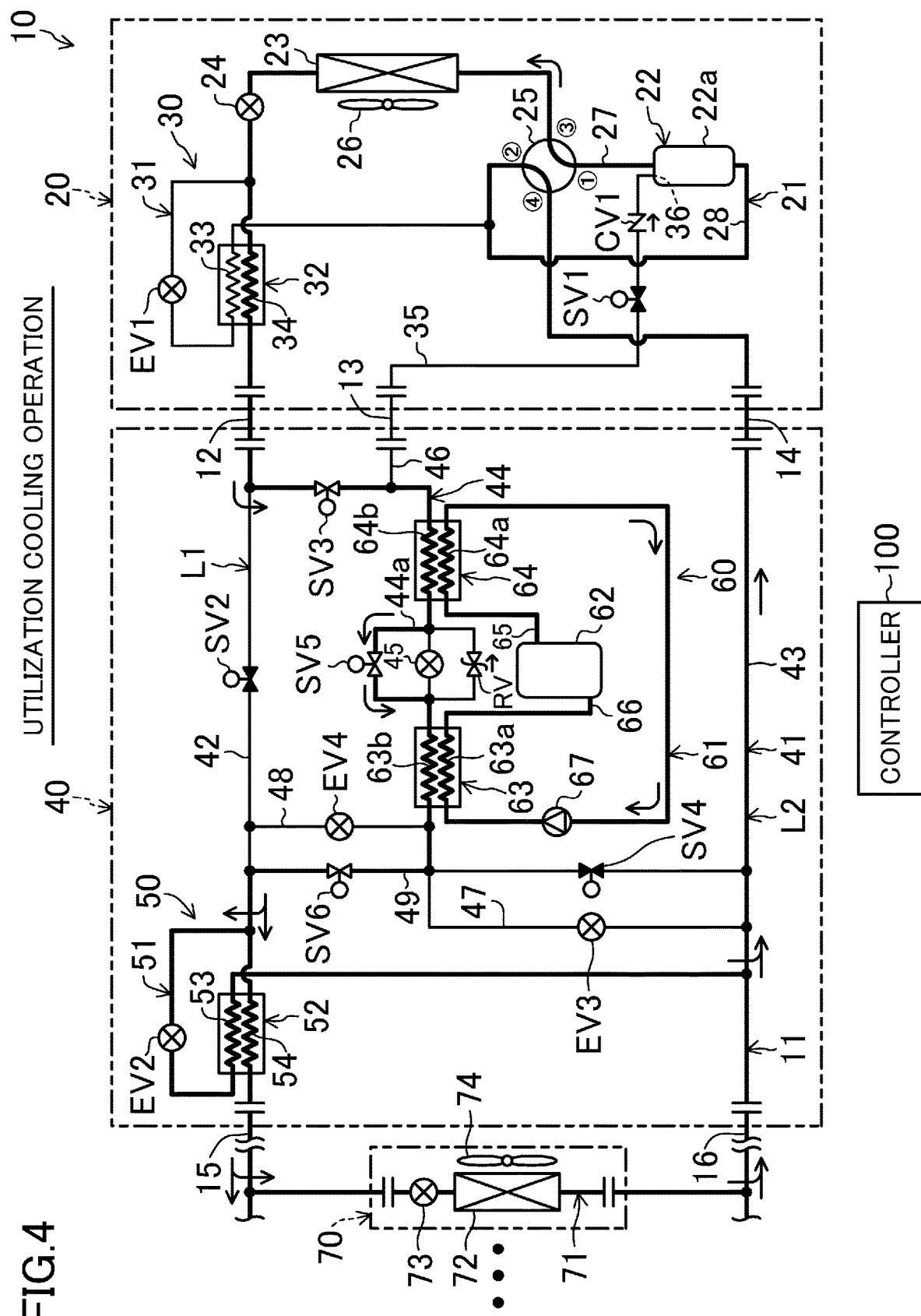
FIG. 4 is a view corresponding to FIG. 1 illustrating the behavior of a utilization cooling operation.

In the utilization cooling operation, the thermal storage device (60) is actuated, and the cold thermal energy of the thermal storage medium stored in the thermal storage tank (62) is utilized to cool the room. In the utilization cooling operation illustrated in FIG. 4, the four-way switching valve (25) is in the first state, and the third solenoid valve (SV3), the fifth solenoid valve (SV5), and the sixth solenoid valve (SV6) among the first to sixth solenoid valves (SV1-SV6) are open. The rest of the solenoid valves are closed. The first decompression valve (EV1) and the fourth decompression valve (EV4) are fully closed. The outdoor expansion valve (24) is fully open. The degrees of opening of the second decompression valve (EV2) and the indoor expansion valve (73) are appropriately adjusted. The compressor (22), the outdoor fan (26), and the indoor fan (74) are actuated. The thermal storage device (60) is actuated since the pump (67) is in operation. In the utilization cooling operation, the refrigerant circuit (11) performs a refrigeration cycle in which the outdoor heat exchanger (23) serves as a condenser, the preheating heat exchanger (64), the thermal storage heat exchanger (63), and the second subcooling heat exchanger (52) as radiators (refrigerant coolers), and the indoor heat exchanger (72) as an evaporator.

The refrigerant discharged from the compressor (22) is condensed by the outdoor heat exchanger (23). The condensed refrigerant is cooled by the preheating heat exchanger (64) of the primary thermal storage channel (44), passes through the first bypass pipe (44a), and further cooled by the thermal storage heat exchanger (63). A large part of the refrigerant which has flowed through the primary thermal storage channel (44) and the third branch pipe (49) into the liquid line (L1) flows through the fourth heat transfer channel (54). The rest of the refrigerant is decompressed by the second decompression valve (EV2) and then flows through the third heat transfer channel (53). In the second subcooling heat exchanger (52), the refrigerant flowing through the fourth heat transfer channel (54) is cooled by the refrigerant in the third heat transfer channel (53). The refrigerant cooled by the second subcooling heat exchanger (52) is decompressed by the indoor expansion valve (73), and then evaporates in the indoor heat exchanger (72). The refrigerant flowing through the gas line (L2) merges with the refrigerant which has flowed out of the second introduction pipe (51), and is taken into the compressor (22).

[Cooling and Cold Thermal Energy Storage Operation]

Figure 5:
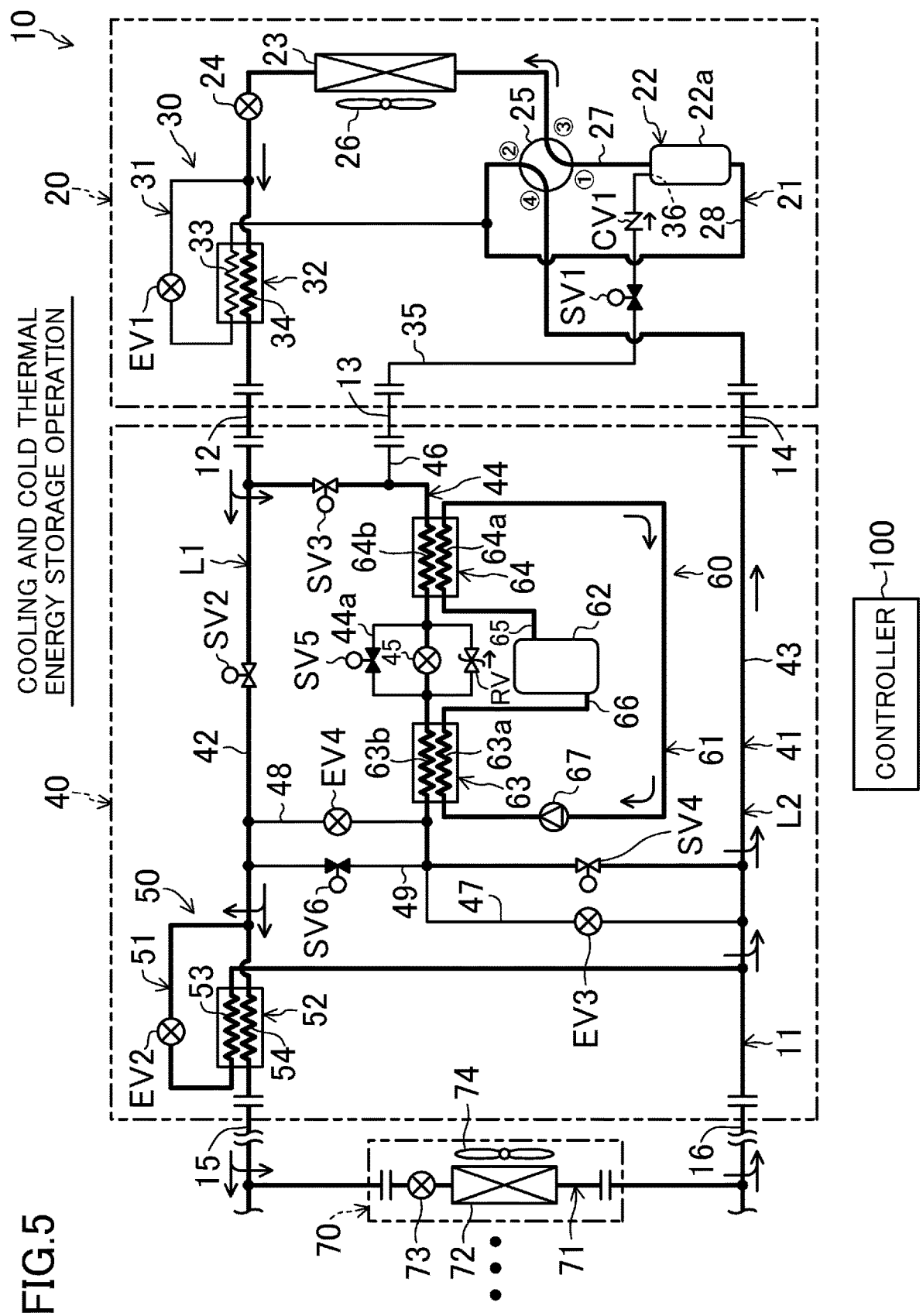
FIG. 5 is a view corresponding to FIG. 1 illustrating the behavior of a cooling and cold thermal energy storage operation.

In the cooling and cold thermal energy storage operation, the thermal storage device (60) is actuated to store cold thermal energy in the thermal storage medium, and the room is cooled by the indoor unit (70). In the cooling and cold thermal energy storage operation illustrated in FIG. 5, the four-way switching valve (25) is in the first state, and the second solenoid valve (SV2), the third solenoid valve (SV3), and the fourth solenoid valve (SV4) among the first to sixth solenoid valves (SV1-SV6) are open. The rest of the solenoid valves are closed. The first decompression valve (EV1), the third decompression valve (EV3) and the fourth decompression valve (EV4) are fully closed. The outdoor expansion valve (24) is fully open. The degrees of opening of the second decompression valve (EV2), the thermal storage expansion valve (45), and the indoor expansion valve (73) are appropriately adjusted. The compressor (22), the outdoor fan (26), and the indoor fan (74) are actuated. The thermal storage device (60) is actuated since the pump (67) is in operation. In the refrigerant circuit (11) in the cooling and cold thermal energy storage operation, the outdoor heat exchanger (23) serves as a condenser, the preheating heat exchanger (64) and the second subcooling heat exchanger (52) as radiators (refrigerant coolers), and the thermal storage heat exchanger (63) and the indoor heat exchanger (72) as evaporators.

The refrigerant discharged from the compressor (22) is condensed by the outdoor heat exchanger (23). The condensed refrigerant flows through the second heat transfer channel (34) and is diverged into the primary thermal storage channel (44) and the primary liquid pipe (42). The refrigerant in the primary thermal storage channel (44) is cooled by the thermal storage medium in the preheating heat exchanger (64), and is decompressed by the thermal storage expansion valve (45). A large part of the refrigerant in the primary liquid pipe (42) flows through the fourth heat transfer channel (54), and the rest of the refrigerant is decompressed by the second decompression valve (EV2) and then flows through the third heat transfer channel (53). In the second subcooling heat exchanger (52), the refrigerant flowing through fourth heat transfer channel (54) is cooled by the refrigerant in the third heat transfer channel (53). The refrigerant cooled by the second subcooling heat exchanger (52) is decompressed by the indoor expansion valve (73), and then evaporates in the indoor heat exchanger (72). The refrigerant flowing through the gas line (L2) merges with the refrigerant which has flowed out of the second introduction pipe (51), and is taken into the compressor (22).

[Simple Heating Operation]

Figure 6:
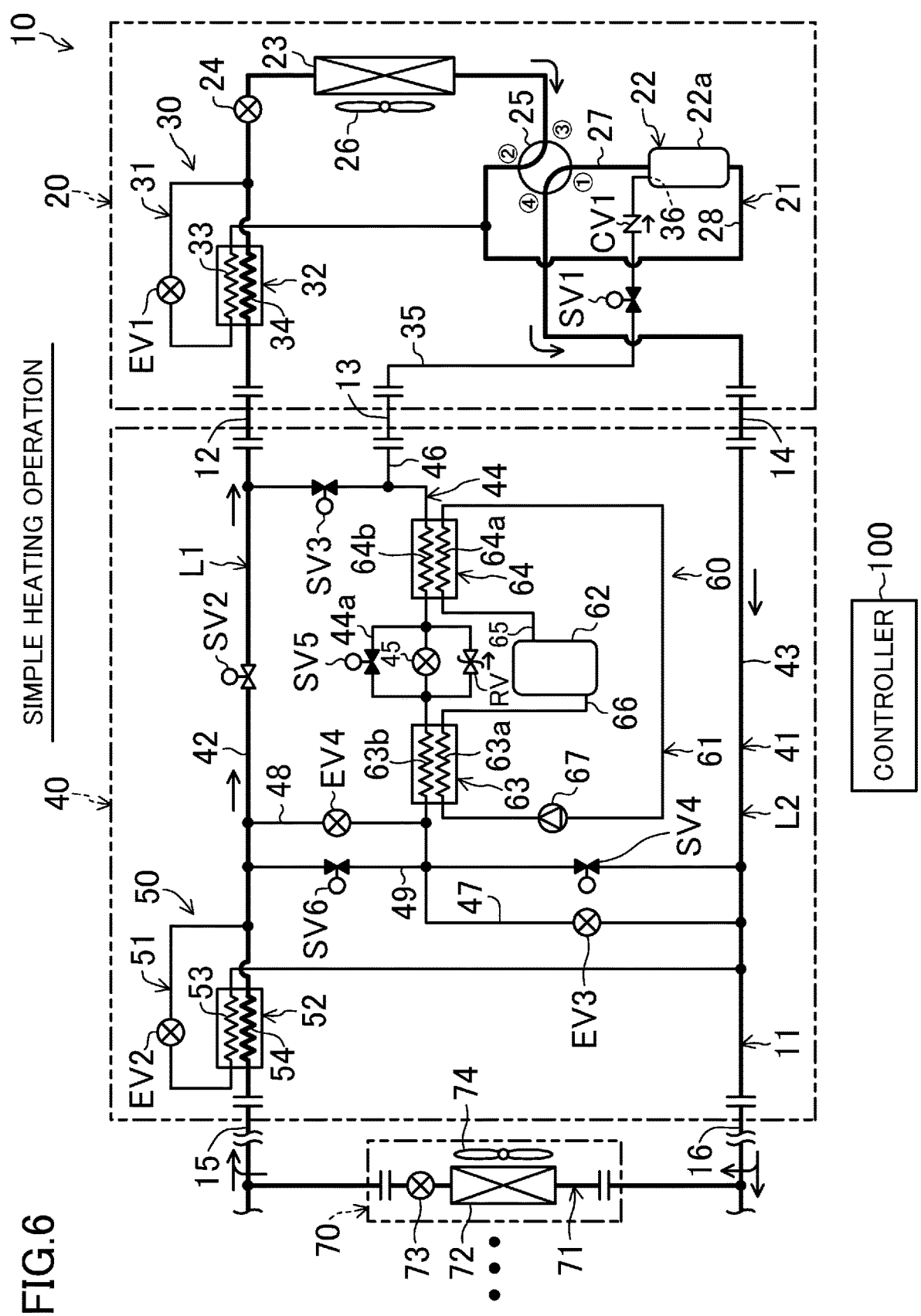
FIG. 6 is a view corresponding to FIG. 1 illustrating the behavior of a simple heating operation.

In the simple heating operation, the thermal storage device (60) is stopped, and the indoor unit (70) heats a room. In the simple heating operation illustrated in FIG. 6, the four-way switching valve (25) is in the second state, and the second solenoid valve (SV2) among the first to sixth solenoid valves (SV1-SV6) is open. The rest of the solenoid valves are closed. The first to fourth decompression valves (EV1-EV4) and the thermal storage expansion valve (45) are fully closed. The degrees of opening of the indoor expansion valve (73) and the outdoor expansion valve (24) are appropriately adjusted. The compressor (22), the outdoor fan (26), and the indoor fan (74) are actuated. The thermal storage device (60) is not actuated since the pump (67) is stopped. In the simple heating operation, the refrigerant circuit (11) performs a refrigeration cycle in which the indoor heat exchanger (72) serves as a condenser, and the outdoor heat exchanger (23) as an evaporator. The indoor expansion valve (73) controls the degree of subcooling of the refrigerant at the exit of the indoor heat exchanger (72).

The refrigerant discharged from the compressor (22) flows through the gas line (L2) and is condensed by the indoor heat exchanger (72). The refrigerant which has flowed into the liquid line (L1) is decompressed by the outdoor expansion valve (24), and then evaporates in the outdoor heat exchanger (23) and is taken into the compressor (22).

[Warm Thermal Energy Storage Operation]

Figure 7:
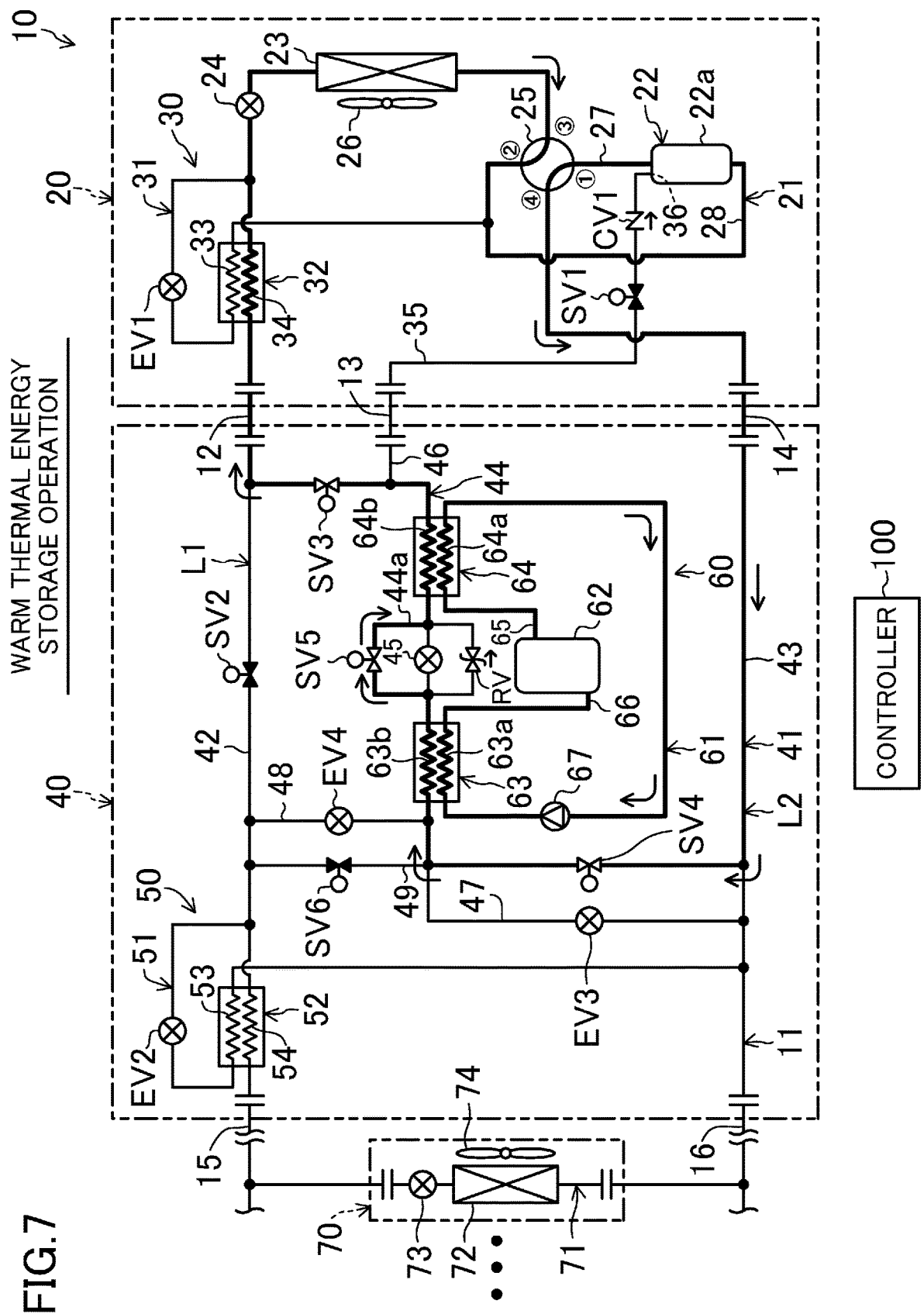
FIG. 7 is a view corresponding to FIG. 1 illustrating the behavior of a warm thermal energy storage operation.

In a warm thermal energy storage operation, the thermal storage medium in which warm thermal energy is stored is accumulated in the thermal storage tank (62). In the warm thermal energy storage operation illustrated in FIG. 7, the four-way switching valve (25) is in the second state, and the third solenoid valve (SV3), the fourth solenoid valve (SV4), and the fifth solenoid valve (SV5) among the first to sixth solenoid valves (SV1-SV6) are open. The rest of the solenoid valves are closed. The first to fourth decompression valves (EV1-EV4) and the indoor expansion valve (73) are fully closed. The degree of opening of the outdoor expansion valve (24) is appropriately adjusted. The compressor (22) and the outdoor fan (26) are actuated, and the indoor fan (74) is stopped. The thermal storage device (60) is actuated since the pump (67) is in operation. In the warm thermal energy storage operation, the refrigerant circuit (11) performs a refrigeration cycle in which the thermal storage heat exchanger (63) and the preheating heat exchanger (64) serve as condensers, and the outdoor heat exchanger (23) as an evaporator.

The refrigerant discharged from the compressor (22) passes through the gas line (L2), dissipates heat in the thermal storage heat exchanger (63), passes through the first bypass pipe (44a), and then further dissipates heat in the preheating heat exchanger (64). The refrigerant which has flowed out of the primary thermal storage channel (44) is decompressed by the outdoor expansion valve (24), and then evaporates in the outdoor heat exchanger (23) and is taken into the compressor (22). The thermal storage medium heated by the thermal storage heat exchanger (63) and the preheating heat exchanger (64) is accumulated in the thermal storage tank (62).

[Heating and Warm Thermal Energy Storage Operation]

In the heating and warm thermal energy storage operation, the thermal storage device (60) is actuated to store warm thermal energy in the thermal storage tank (62), and the room is heated by the indoor unit (70). The heating and warm thermal energy storage operation is roughly grouped into a first heating and warm thermal energy storage operation (hereinafter referred to as a heating and warm thermal energy storage operation (1)) and a second heating and warm thermal energy storage operation (hereinafter referred to as a heating and warm thermal energy storage operation (2)).

[Heating and Warm Thermal Energy Storage Operation (1)]

Figure 8:
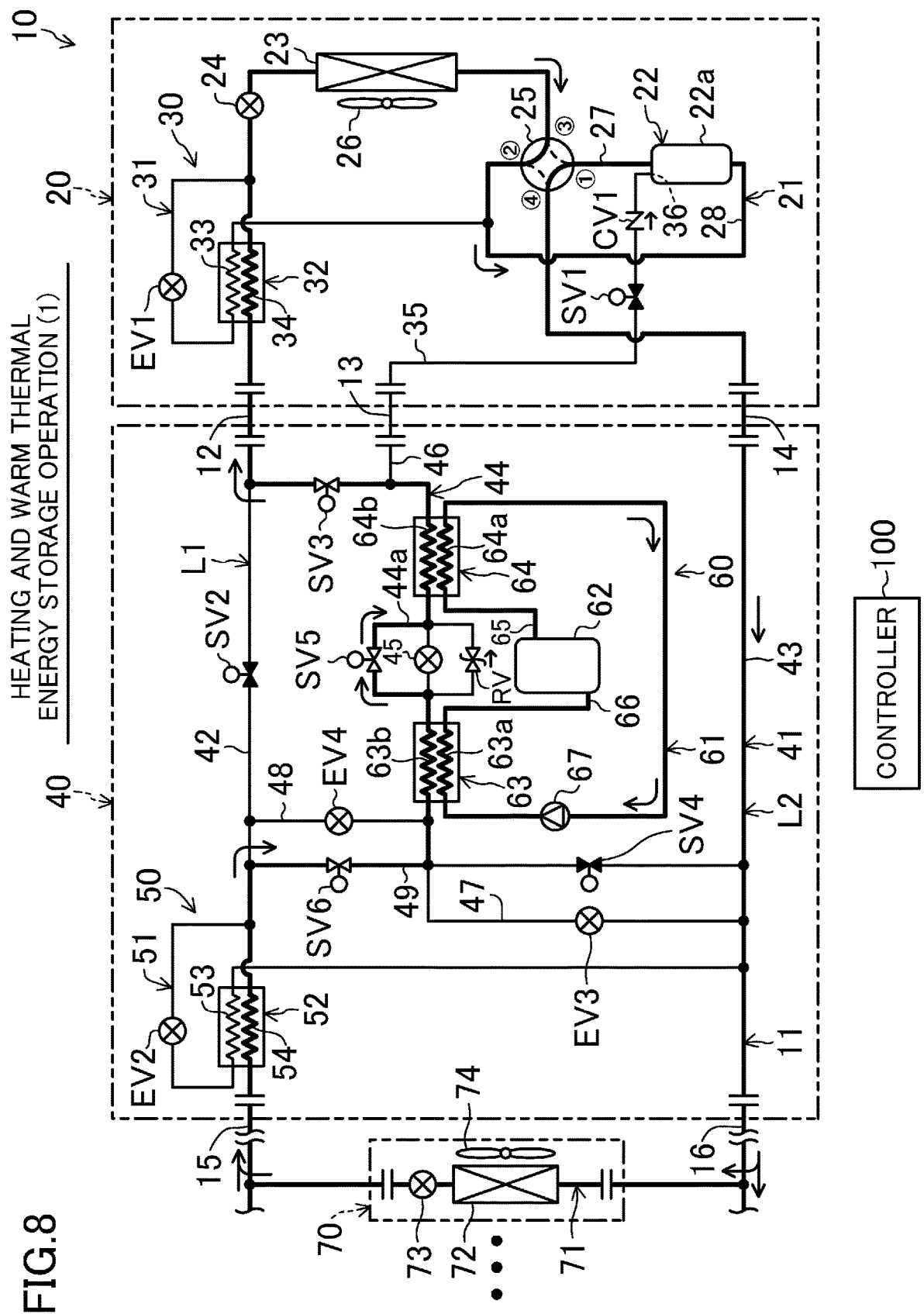
FIG. 8 is a view corresponding to FIG. 1 illustrating a heating and warm thermal energy storage operation (1).

In the heating and warm thermal energy storage operation (1) illustrated in FIG. 8, the four-way switching valve (25) is in the second state, and third solenoid valve (SV3), the fifth solenoid valve (SV5), and the sixth solenoid valve (SV6) among the first to sixth solenoid valves (SV1-SV6) are open. The rest of the solenoid valves are closed. The first to fourth decompression valves (EV1-EV4) and the thermal storage expansion valve (45) are fully closed. The degrees of opening of the indoor expansion valve (73) and the outdoor expansion valve (24) are appropriately adjusted. The compressor (22), the outdoor fan (26), and the indoor fan (74) are actuated. The thermal storage device (60) is actuated since the pump (67) is in operation. In the warm thermal energy storage operation, the refrigerant circuit (11) performs a refrigeration cycle in which the indoor heat exchanger (72) serves as a condenser, the thermal storage heat exchanger (63) and the preheating heat exchanger (64) as radiators, and the outdoor heat exchanger (23) as an evaporator.

The refrigerant discharged from the compressor (22) flows through the gas line (L2), and all of the refrigerant flows through the indoor heat exchanger (72). In the indoor heat exchanger (72), the refrigerant dissipates heat to the indoor air and is condensed. All of the refrigerant condensed in the indoor heat exchanger (72) flows through the third branch pipe (49) and the thermal storage heat exchanger (63). In the thermal storage heat exchanger (63), the refrigerant dissipates heat to the thermal storage medium, so that the thermal storage medium is heated. The refrigerant which has flowed through the thermal storage heat exchanger (63) further dissipates heat to the thermal storage medium in the preheating heat exchanger (64), and flows through the liquid line (L1). This refrigerant evaporates in the outdoor heat exchanger (23) and is taken into the compressor (22).

In this manner, all of the refrigerant condensed in the indoor heat exchanger (72) flows through the thermal storage heat exchanger (63) in the heating and warm thermal energy storage operation (1). Thus, heat of the surplus refrigerant which is not used for heating the room may be utilized for storing warm thermal energy in the thermal storage medium.

[Heating and Warm Thermal Energy Storage Operation (2)]

Figure 9:
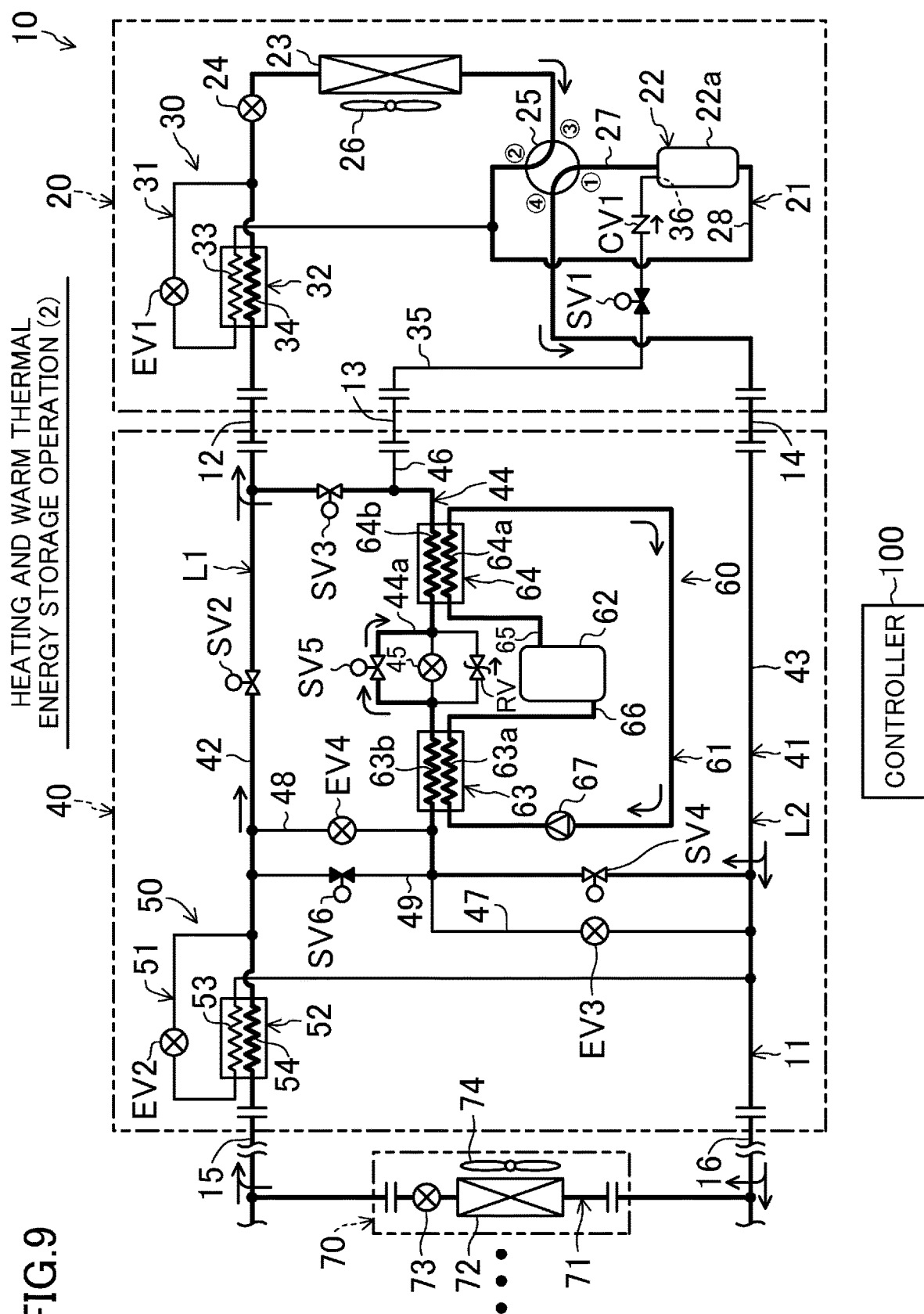
FIG. 9 is a view corresponding to FIG. 1 illustrating a heating and warm thermal energy storage operation (2).

In the heating and warm thermal energy storage operation (2) illustrated in FIG. 9, the four-way switching valve (25) is in the second state, and the second solenoid valve (SV1), the third solenoid valve (SV3), the fourth solenoid valve (SV4), and the fifth solenoid valve (SV5) among the first to sixth solenoid valves (SV1-SV6) are open. The rest of the solenoid valves are closed. The first to fourth decompression valves (EV1-EV4) are fully closed. The degrees of opening of the indoor expansion valve (73) and the outdoor expansion valve (24) are appropriately adjusted. The compressor (22), the outdoor fan (26), and the indoor fan (74) are actuated. The thermal storage device (60) is actuated since the pump (67) is in operation. In the warm thermal energy storage operation, the refrigerant circuit (11) performs a refrigeration cycle in which the indoor heat exchanger (72) and the thermal storage heat exchanger (63) serve as condensers, and the outdoor heat exchanger (23) as an evaporator.

The refrigerant discharged from the compressor (22) flows through the gas line (L2), and part of the refrigerant flows through the indoor heat exchanger (72) and the rest of the refrigerant flows through the primary thermal storage channel (44). In the indoor heat exchanger (72), the refrigerant dissipates heat to the indoor air and is condensed. The refrigerant condensed in the indoor heat exchanger (72) flows through primary liquid pipe (42).

The refrigerant in the primary thermal storage channel (44) dissipates heat to the thermal storage medium in the thermal storage heat exchanger (63) and is condensed. This refrigerant is a high-temperature and high-pressure gas refrigerant, which increases a temperature difference between the refrigerant and the thermal storage medium. The thermal storage medium may thus be given the warm thermal energy with reliability. The refrigerant condensed by the thermal storage heat exchanger (63) merges with the refrigerant flowing through the primary liquid pipe (42), and is decompressed by the outdoor expansion valve (24). The decompressed refrigerant evaporates in the outdoor heat exchanger (23) and is taken into the compressor (22).

In this manner, in the heating and warm thermal energy storage operation (2), the high-temperature and high-pressure gas refrigerant discharged from the compressor (22) flows into both of the indoor heat exchanger (72) and the thermal storage heat exchanger (63) in a parallel manner, and is condensed in the respective heat exchangers. Thus, the warm thermal energy is reliably given to the thermal storage medium, while continuing heating of the room.

[Utilization Heating Operation]

In the utilization heating operation, the thermal storage device (60) is actuated, and the warm thermal energy of the thermal storage medium stored in the thermal storage tank (62) is utilized as heat of vaporization of the low-pressure refrigerant. Heating loads may thus be reduced. The utilization heating operation is roughly grouped into a first utilization heating operation (hereinafter referred to as a utilization heating operation (1)) and a second utilization heating operation (hereinafter referred to as a utilization heating operation (2)).

[Utilization Heating Operation (1)]

The utilization heating operation (1) is performed under a condition in which a difference (MP–LP) is relatively small between a pressure (MP) of the refrigerant which evaporates in the thermal storage heat exchanger (63) and a pressure (LP) of the refrigerant which evaporates in the outdoor heat exchanger (23). For example, this condition is met in a situation in a winter season in which a temperature of outside air is relatively high, but a temperature of the thermal storage medium in the thermal storage circuit (61) of the thermal storage device (60) is relatively low.

Figure 10:
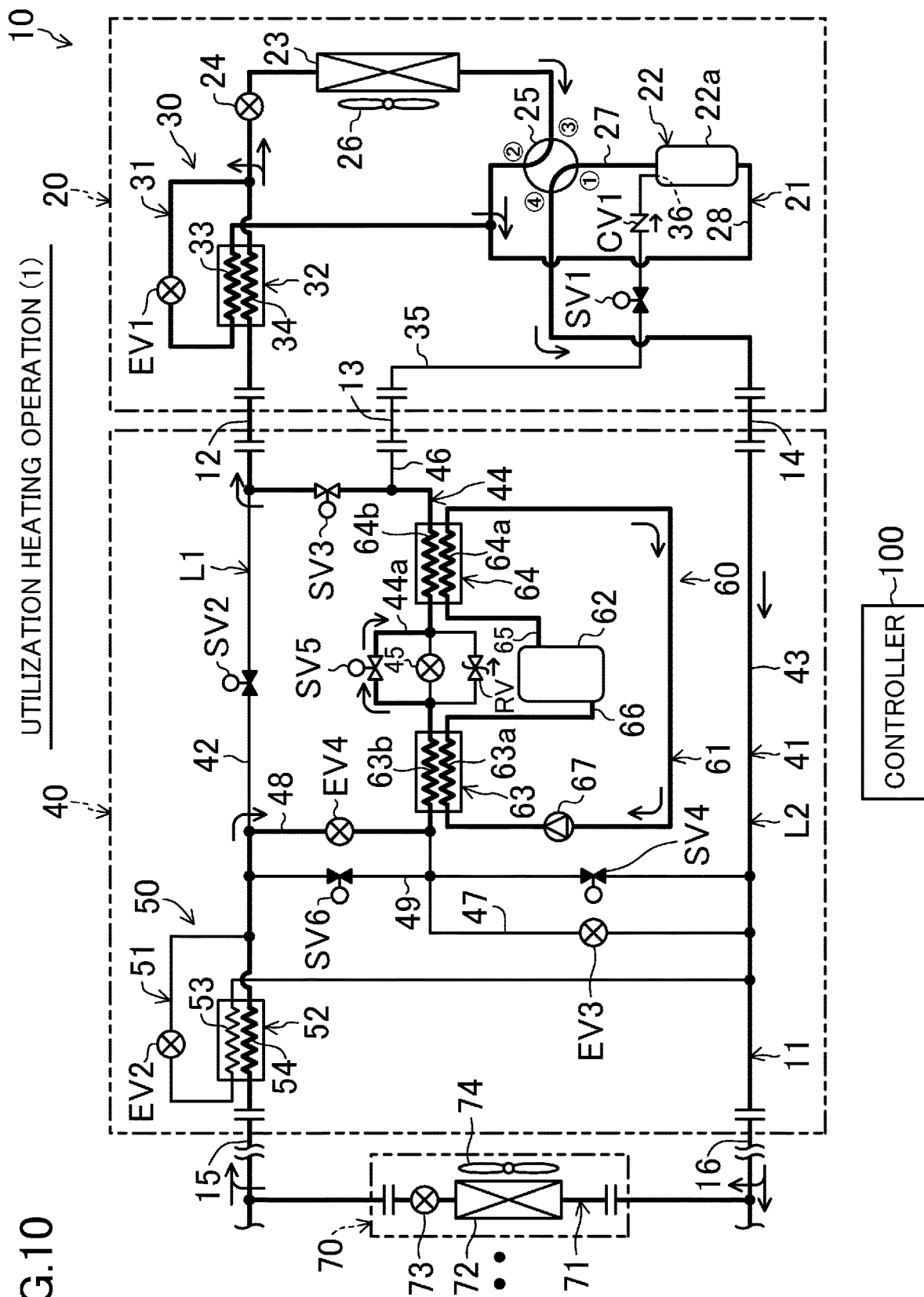
FIG. 10 is a view corresponding to FIG. 1 illustrating a utilization heating operation (1).

In the utilization heating operation (1) illustrated in FIG. 10, the four-way switching valve (25) is in the second state, and the third solenoid valve (SV3) and the fifth solenoid valve (SV5) among the first to sixth solenoid valves (SV1-SV6) are open. The rest of the solenoid valves are closed. The first decompression valve (EV1) and the outdoor expansion valve (24) are fully open. The second decompression valve (EV2) and the third decompression valve (EV3) are fully closed. The degree of opening of the fourth decompression valve (EV4) and the indoor expansion valve (73) are appropriately adjusted. The compressor (22) and the indoor fan (74) are actuated, and the outdoor fan (26) is stopped. The thermal storage device (60) is actuated since the pump (67) is in operation. In the utilization heating operation (1), the refrigerant circuit (11) performs a refrigeration cycle in which the indoor heat exchanger (72) serves as a condenser, and the thermal storage heat exchanger (63) as an evaporator.

The refrigerant discharged from the compressor (22) flows through the gas line (L2) and is condensed by the indoor heat exchanger (72). All of the refrigerant which has flowed into the liquid line (L1) flows in the second branch pipe (48). In the second branch pipe (48), the refrigerant is decompressed to a low pressure by the fourth decompression valve (EV4). The decompressed refrigerant flows through the thermal storage refrigerant channel (63b) of the thermal storage heat exchanger (63), and absorbs heat from the thermal storage medium and evaporates. The refrigerant which has evaporated in the thermal storage heat exchanger (63) passes through the first bypass pipe (44a), flows through the preheating refrigerant channel (64b) of the preheating heat exchanger (64), and absorbs heat from the thermal storage medium and further evaporates. This refrigerant flows through the primary thermal storage channel (44) and is diverged into the first introduction pipe (31) and the outdoor heat exchanger (23). These refrigerants merge with each other in the suction pipe (28) and is taken into the compressor (22). Thus, the pressure loss of the refrigerant, and hence the power to actuate the compressor (22), may be reduced. The refrigerant flowing through the first introduction pipe (31) flows through the first subcooling heat exchanger (32), which is not an air heat exchanger. Thus, heat loss is also small. In addition, even when the refrigerant flows through the outdoor heat exchanger (23), the heat loss is small since the outdoor fan (26) stays at rest. In this manner, the pressure loss and/or heat loss of the low-pressure gas refrigerant may be reduced in the utilization heating operation (1). In addition, the first introduction pipe (31) also serves as a low-pressure injection pipe for subcooling of the refrigerant. The number of pipes may thus be reduced.

Note that in the utilization heating operation (1), only the outdoor expansion valve (24), of the first decompression valve (EV1) and the outdoor expansion valve (24), may be fully closed to allow the low-pressure gas refrigerant to flow only to the first introduction pipe (31). Further, only the first decompression valve (EV1), of the first decompression valve (EV1) and the outdoor expansion valve (24), may be fully closed to allow the low-pressure gas refrigerant to flow only to the outdoor heat exchanger (23).

[Utilization Heating Operation (2)]

The utilization heating operation (2) is performed under a condition in which a difference (MP–LP) is relatively large between a pressure (MP) of the refrigerant which evaporates in the thermal storage heat exchanger (63) and a pressure (LP) of the refrigerant which evaporates in the outdoor heat exchanger (23). For example, this condition is met in a situation in a winter season in which a temperature of outside air is relatively low, but a temperature of the thermal storage medium in the thermal storage circuit (61) of the thermal storage device (60) is relatively high.

Figure 11:
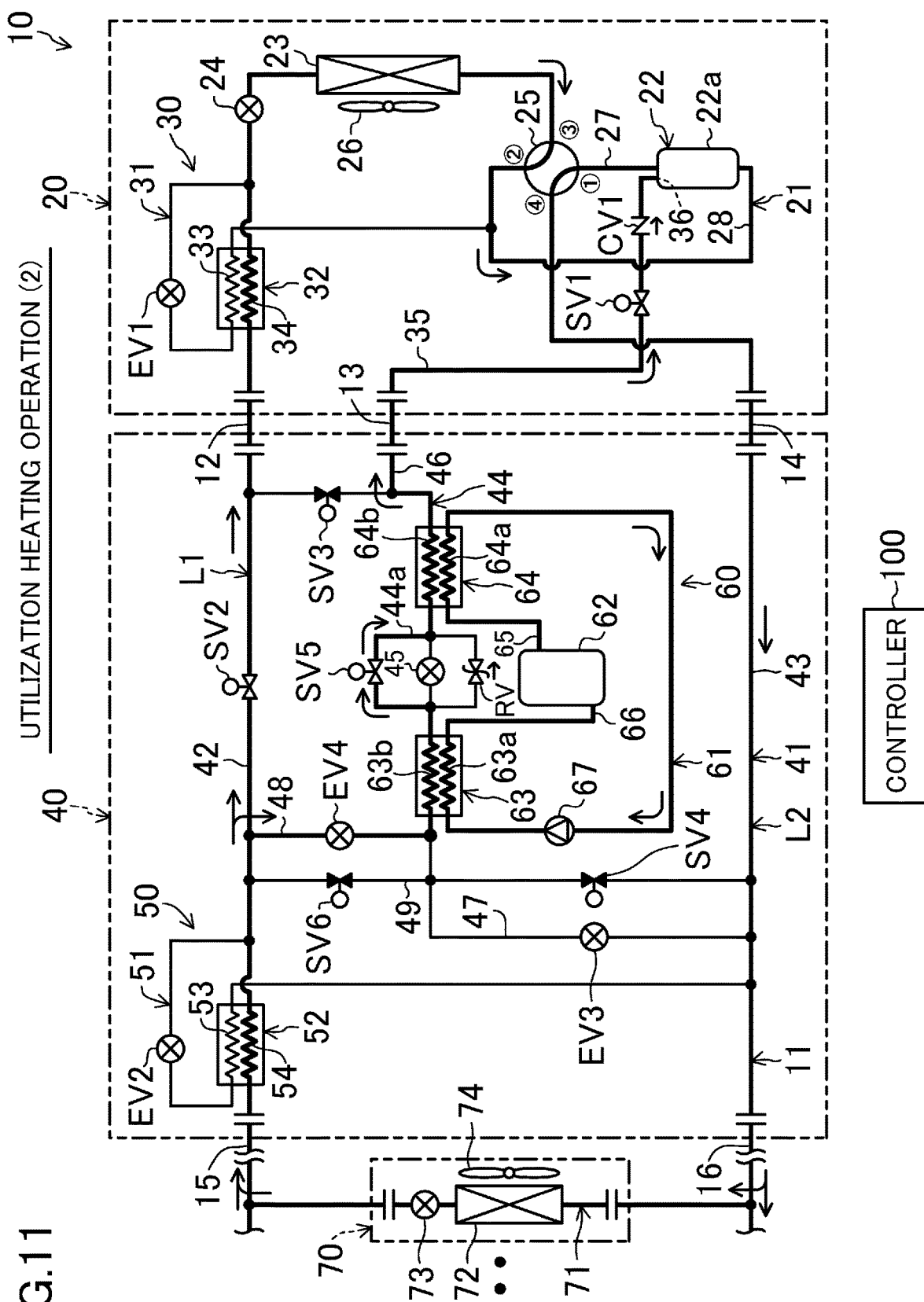
FIG. 11 is a view corresponding to FIG. 1 illustrating a utilization heating operation (2).

In the utilization heating operation (2) illustrated in FIG. 11, the four-way switching valve (25) is in the second state, the first solenoid valve (SV1), the second solenoid valve (SV3), and the fifth solenoid valve (SV5) among the first to sixth solenoid valves (SV1-SV6) are open. The rest of the solenoid valves are closed. The first to third decompression valves (EV1-EV3) are fully closed. The degrees of opening of the fourth decompression valve (EV4), the indoor expansion valve (73) and the outdoor expansion valve (24) are appropriately adjusted. The compressor (22), the outdoor fan (26), and the indoor fan (74) are actuated. The thermal storage device (60) is actuated since the pump (67) is in operation. In the utilization heating operation, the refrigerant circuit (11) performs a refrigeration cycle in which the indoor heat exchanger (72) serves as a condenser, and the thermal storage heat exchanger (63), the preheating heat exchanger (64), and the outdoor heat exchanger (23) as evaporators.

The refrigerant discharged from the compressor (22) flows through the gas line (L2) and is condensed by the indoor heat exchanger (72). The refrigerant which has flowed into the liquid line (L1) is diverged into the second branch pipe (48) and the primary liquid pipe (42). The refrigerant in the second branch pipe (48) is decompressed by the fourth decompression valve (EV4) to an intermediate pressure (between a high pressure and a low pressure in the refrigerant circuit (11)) and flows into the primary thermal storage channel (44). The refrigerant in the primary thermal storage channel (44) is heated in the thermal storage heat exchanger (63) and the preheating heat exchanger (64) and evaporates. The evaporated refrigerant sequentially passes through the intermediate junction pipe (46), the communication pipe (13), and the intermediate suction pipe (35), and is taken into the compression chamber of the compressor (22) in the middle of compression.

The refrigerant in the primary liquid pipe (42) is decompressed by the outdoor expansion valve (24), evaporates in the outdoor heat exchanger (23), and is taken into the suction pipe (28) of the compressor (22). In the compression chamber of the compressor (22), the low-pressure refrigerant taken through the suction pipe (28) is compressed to the intermediate pressure, mixed with the intermediate-pressure refrigerant taken through the intermediate suction pipe (35), and then compressed to have a high pressure.

The utilization heating operation (2) is performed under a condition in which the temperature of the outside air is low and the temperature of the thermal storage medium of the thermal storage circuit (61) of the thermal storage device (60) is relatively high. Thus, in the utilization heating operation (2), the difference (MP–LP) between the evaporating pressure MP of the refrigerant in the thermal storage heat exchanger (63) and the evaporating pressure LP of the refrigerant in the outdoor heat exchanger (23) is relatively large. Thus, in the middle of the compression process in the compression chamber of the compressor (22), the possibility that the internal pressure of the compression chamber becomes higher than the pressure of the refrigerant introduced therein through the intermediate suction pipe (35) may be reduced, which allows the refrigerant in the intermediate suction pipe (35) to be reliably introduced in the compression chamber.

Moreover, the intermediate suction pipe (35) is provided with the check valve (CV1) which prohibits the backflow of the refrigerant from the compressor (22) toward the primary thermal storage channel (44). Thus, even if the pressure MP of the refrigerant flowing out of the intermediate suction pipe (35) is lower than the internal pressure of the compression chamber in the middle of the compression process, the refrigerant in the compression chamber does not flow back into the intermediate suction pipe (35). The check valve (CV1) may be provided at the inner pipe portion (36) of the intermediate suction pipe (35) located inside the casing (22a) of the compressor (22). This configuration may achieve a minimum channel length from the compression chamber of the compression mechanism in the middle of the compression process to the check valve (CV1), and therefore a minimum dead volume that does not contribute to the compression of the refrigerant. As a result, a decline in the compression efficiency of compressor (22) may be prevented.

Further, if the refrigerant is compressed under the condition in which the difference MP–LP is relatively large, the overall workloads required for the compressor (22) to compress the refrigerant to a high pressure are reduced. As a result, the utilization heating operation (2) may achieve energy-efficient heating, while giving the warm thermal energy of the thermal storage medium to the refrigerant.

[First Mode of Utilization Heating Operation]

In the above-described utilization heating operation (1) and/or the utilization heating operation (2), the controller (100) compares an outside-air temperature To detected by the outside-air temperature sensor (S1) (see FIG. 1) with a predetermined temperature Ta. If the detected outside-air temperature To is higher than or equal to the predetermined temperature Ta, the controller (100) determines that a first condition is satisfied, and performs a first mode.

The first mode is a type of operation performed in the utilization heating operation (1) and/or the utilization heating operation (2) in which the thermal storage medium heats the refrigerant via the thermal storage heat exchanger (63) only when the temperature of the thermal storage medium is higher than a temperature at which hydrates are generated. It can thus be said that, of sensible heat and latent heat stored in the thermal storage medium, only the sensible heat is used for heating in the first mode.

In the first mode, the relatively high sensible heat of the thermal storage medium is given to the refrigerant via the thermal storage heat exchanger (63) and/or the preheating heat exchanger heat exchanger (64). Thus, even if heat is exchanged between the thermal storage medium and the refrigerant, the evaporating pressure can be maintained at a relatively high pressure, and the efficiency of heating can be improved. However, in the first mode, the outside-air temperature To is high and the evaporating pressure of the low-pressure refrigerant in the outdoor heat exchanger (23) is also high. Thus, if the first mode is maintained and the temperature of the thermal storage medium in the thermal storage circuit (61) gradually decreases, the evaporating pressure in the thermal storage circuit (61) also decreases. In this state, maintaining the first mode no longer improves the efficiency of heating. To avoid such a situation, the controller (100) terminates the first mode when the temperature of the thermal storage medium detected by the thermal storage medium temperature sensor (S2) is lower than a reference temperature Tb, and controls devices to perform a simple heating operation. The reference temperature Tb used herein is a predetermined temperature higher than or equal to a temperature at which hydrates are generated (e.g., 12° C.).

In the simple heating operation (FIG. 6) thus performed, the pump (67) is stopped, so that the refrigerant does not flow through the thermal storage heat exchanger (63). This means that the thermal storage medium is not cooled by the refrigerant any more, and thus the temperature of the thermal storage medium will not be lower than or equal to the temperature at which hydrates are generated. As a result, crystallization and accumulation of clathrate hydrates in the pipes of the thermal storage circuit (61) may be prevented, which may reliably prevent clogging of the thermal storage circuit (61). Moreover, heating of the room is maintained by the shift to the simple heating operation, and comfort of the room is not deteriorated.

[Second Mode of Utilization Heating Operation]

In the above-described utilization heating operation (1) and/or the utilization heating operation (2), the controller (100) determines that the first condition is not satisfied and performs a second mode of operation when the detected outside-air temperature To is lower than the predetermined temperature Ta.

The second mode is a type of operation in which the thermal storage medium continues to heat the refrigerant via the thermal storage heat exchanger (63) even after the temperature of the thermal storage medium falls below the temperature at which hydrates are generated. It can thus be said that both sensible heat and latent heat stored in the thermal storage medium are utilized for heating in the second mode.

In the second mode, the relatively low latent heat of the thermal storage medium is given to the refrigerant via the thermal storage heat exchanger (63) and the preheating heat exchanger heat exchanger (68). In the second mode, the outside-air temperature To is low, and the evaporating pressure of the low-pressure refrigerant in the outdoor heat exchanger (23) is also low. Thus, the evaporating pressure can be maintained at a relatively high pressure, and the efficiency of heating can be improved, by exchanging heat between the thermal storage medium and the refrigerant.

If the second mode is maintained, the temperature of the thermal storage medium in the thermal storage circuit (61) gradually decreases and falls below the temperature at which hydrates are generated. As a result, clathrate hydrates may be generated and crystals of the hydrates may accumulate in the pipes of the thermal storage circuit (61). To avoid this phenomenon, the thermal storage device (60) is configured to use the thermal storage medium temperature sensor (S2) to detect start of accumulation of the crystals of the clathrate hydrates.

Specifically, the thermal storage medium of the thermal storage circuit (61) falls in a subcooled state, and hence crystals of the hydrates are not generated, even when the temperature thereof falls below the temperature at which hydrates are generated. However, the subcooled state ends and hydrate crystals are generated, if the thermal storage medium in the subcooled state is given some trigger such as impact. If the subcooled state ends, the temperature of the thermal storage medium increases to a temperature close to the temperature at which hydrates are generated. If the thermal storage medium temperature sensor (S2) detects that the temperature of the thermal storage medium has increased, the controller (100) determines that the crystals of clathrate hydrates start to accumulate. For example, a flow-rate detector for detecting a circulating volume of the thermal storage medium in the thermal storage circuit (61) may be used as an accumulation detector for detecting the start of accumulation of the crystals of clathrate hydrates. That is, it may be detected that the crystals of clathrate hydrates start to accumulate when the flow-rate detector detects that the circulating volume of the thermal storage medium in the thermal storage circuit (61) is lower than a predetermined value.

If the start of accumulation of crystals of the clathrate hydrates is detected, the controller (100) stops the second mode and performs the heating and warm thermal energy storage operation. Specifically, if the start of accumulation of crystals of the clathrate hydrates is detected, the controller (100) determines whether a condition indicating the refrigerant that has been condensed in the indoor heat exchanger (72) has a high temperature is met or not.

Specifically, a determination section of the controller (100) compares the temperature Tb of the refrigerant that has been condensed in the indoor heat exchanger (72) with a predetermined reference refrigerant temperature Ts, when shifting the operation from the second mode to the heating and warm thermal energy storage operation. The determination section determines that the above condition is met if the temperature Tb of the refrigerant is higher than the reference refrigerant temperature Ts. In this case, the controller (100) controls the devices to perform the first heating and warm thermal energy storage operation (i.e., the heating and warm thermal energy storage operation (1)), as illustrated in FIG. 8. As a result, the heating and warm thermal energy storage operation (1) is performed in which the entire amount of the refrigerant compressed in the compressor (22) sequentially flows through the indoor heat exchanger (72) and the thermal storage heat exchanger (63). In the heating and warm thermal energy storage operation (1) performed under this condition, the refrigerant which has flowed through the indoor heat exchanger (72) has a sufficiently high temperature. Thus, the thermal storage medium can be well heated by the refrigerant, which allows for maintaining heating of the room.

On the other hand, suppose that the temperature Tb of the refrigerant condensed in the indoor heat exchanger (72) is lower than or equal to the reference refrigerant temperature Ts, when the operation is shifted from the second mode to the heating and warm thermal energy storage operation. In such a case, the determination section of the controller (100) determines that a condition indicating the refrigerant condensed in the indoor heat exchanger (72) has a high temperature is not met. Then, the controller (100) controls the devices to perform the second heating and warm thermal energy storage operation (i.e., the heating and warm thermal energy storage operation (2)), as illustrated in FIG. 9. As a result, the refrigerant compressed by the compressor (22) is diverged into both of the indoor heat exchanger (72) and the thermal storage heat exchanger (63), and evaporates in the respective heat exchangers. Thus, the temperature of the thermal storage medium can be reliably increased, while continuing heating of the room.

<Efficiency of Compressor and Switching of Operation>

Described below are the rotational speed of the compressor (22) and the efficiency of the compressor, and switching of the operation of the thermal storage air conditioner (10) in relation to these aspects of the compressor (22).

[Efficiency of Compressor]

Figure 12:
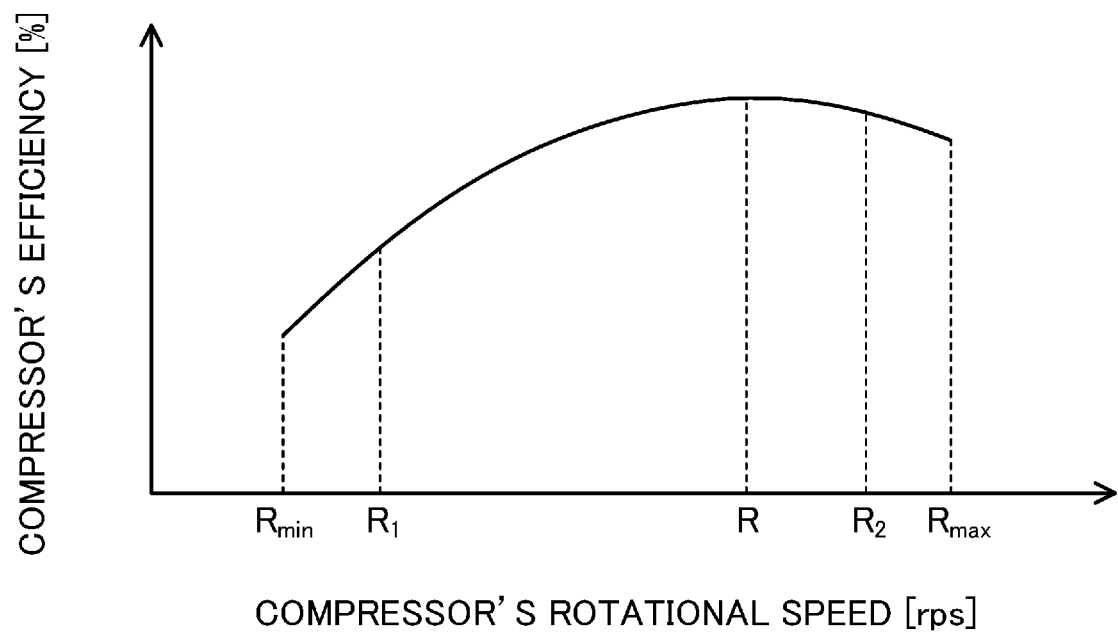
FIG. 12 illustrates an example relationship between the rotational speed of a compressor and the efficiency of the compressor.

As explained in the description of the compressor (22), the motor of the compressor (22) has a variable operating frequency which is varied by an inverter section, and a variable rotational speed. The efficiency of the compressor (22) relies on the rotational speed of the compressor (22). FIG. 12 shows an example relationship between the rotational speed (rps) and the efficiency (%) of the compressor.

In the example shown in FIG. 12, the efficiency of the compressor is at the peak near the rotational speed R. The efficiency of the compressor gradually declines as the compressor has a lower rotational speed than R, and the compressor has the lowest efficiency at a rotational speed Rmin. The efficiency of the compressor also declines when the rotational speed of the compressor is too high, and is lower at a rotational speed Rmax than it is at R.

Thus, desirably, the compressor (22) is driven at a rotational speed which contributes to high efficiency of the compressor. In particular, it is recommended to avoid an extremely slow rotational speed of the compressor, since the efficiency of the compressor quickly declines when the rotational speed is slowed down.

The air-conditioning capacity of the thermal storage air conditioner (10) is controlled by adjusting the rotational speed of the compressor (22). Thus, if the air-conditioning load (a cooling load or a heating load) in a room is lowered during the operation of the thermal storage air conditioner (10), the rotational speed of the compressor (22) is reduced to decrease the air-conditioning capacity of the thermal storage air conditioner (10) according to the air-conditioning load in the room.

Conventionally, If the air conditioner has an excessive air-conditioning capacity with respect to the air-conditioning load even after the rotational speed of the compressor (22) is set to a minimum value (a lowest rotational speed), an on/off operation of the compressor (22), in which the halt and restart of the compressor (22) are repeated, is used to be performed to prevent the room temperature from becoming too low or too high. However, it is recommended to avoid the on/off operation since the on/off operation may increase the power consumption and/or deteriorate the comfort due to frequent on/off switching of the air conditioning.

Instead, in the present invention, switching between the simple cooling operation and the cooling and cold thermal energy storage operation (and switching between the simple heating operation and the heating and warm thermal energy storage operation) is performed as will be described below.

[Switching Between Simple Cooling Operation and Cooling and Cold Thermal Energy Storage Operation]

If a cooling load in a room is lowered in the simple cooling operation, and the rotational speed of the compressor (22) is slowed down to a predetermined lower reference value R1, the controller (100) switches the operation of the thermal storage air conditioner (10) from the simple cooling operation to the cooling and cold thermal energy storage operation.

The lower reference value R1 is set to be larger than Rmin and smaller than R. It is recommended that the lower reference value R1 be set to be slightly larger than Rmin.

In the simple cooling operation, only the indoor air in the indoor heat exchanger (72) is cooled, whereas in the cooling and cold thermal energy storage operation, both the indoor air in the indoor heat exchanger (72) and the thermal storage medium in the thermal storage heat exchanger (63) are cooled. Thus, the low pressure in the refrigeration cycle temporarily increases when the simple cooling operation is switched to the cooling and cold thermal energy storage operation.

On the other hand, in the simple cooling operation and the cooling and cold thermal energy storage operation, the controller (100) adjusts the rotational speed of the compressor (22) so that the low pressure in the refrigeration cycle (i.e., a pressure of the refrigerant taken into the compressor) will be a predetermined target value. Thus, when the simple cooling operation is switched to the cooling and cold thermal energy storage operation, the rotational speed of the compressor (22) needs to be increased to lower the low pressure in the refrigeration cycle to the target value.

To do this, the controller (100) of the present embodiment switches the operation of the thermal storage air conditioner (10) from the simple cooling operation to the cooling and cold thermal energy storage operation to increase the rotational speed of the compressor (22), if the rotational speed of the compressor (22) is slowed down in the simple cooling operation to the lower reference value R1, at which the compressor (22) operates inefficiently. As a result, the rotational speed of the compressor (22) exceeds the lower reference value R1, and the efficiency of the compressor (22) is improved.

Conventionally, If the thermal storage air conditioner (10) has an excessive cooling capacity with respect to the cooling load of the room even after the rotational speed of the compressor (22) is set to a minimum value Rmin, an on/off operation of the compressor (22), in which the halt and restart of the compressor (22) are repeated, is used to be performed to prevent the room temperature from becoming too low.

On the other hand, If the rotational speed of the compressor (22) is slowed down to the lower reference value R1 in the simple cooling operation, the controller (100) of the present embodiment switches the operation of the thermal storage air conditioner (10) from the simple cooling operation to the cooling and cold thermal energy storage operation. With this control, the room can be cooled by utilizing only part of the cold thermal energy obtained by the refrigeration cycle, and the amount of the cold thermal energy used to cool the indoor air in the indoor heat exchanger (72) can be reduced to an appropriate amount for the cooling load in the room, while allowing the actuation of the compressor (22) to keep running. Thus, according to the present embodiment, avoiding the on/off operation of the compressor (22) allows for maintaining the comfort of the room high even in a state in which the cooling load of the room is very low.

The lower reference value R1, based on which the operation is switched from the simple cooling operation to the cooling and cold thermal energy storage operation, is determined from the relationship between the rotational speed and the efficiency of the compressor as shown in FIG. 12, a rotational speed of the compressor (22) for storing cold thermal energy, and any other suitable parameters. The amount of cold thermal energy stored in the thermal storage section (60) may also be used as a parameter based on which the lower reference value is determined.

Now, if the rotational speed of the compressor (22) reaches an upper reference value R2 in the cooling and cold thermal energy storage operation, the controller (100) switches the operation from the cooling and cold thermal energy storage operation to the simple cooling operation to reduce the rotational speed of the compressor (22). The upper reference value R2 is set to be larger than R and smaller than Rmax.

In FIG. 12, for example, the efficiency of the compressor declines as the rotational frequency exceeds R and approaches Rmax. In such a case, the efficiency of the compressor may be increased by switching the operation from the cooling and cold thermal energy storage operation to the simple cooling operation.

Further, the compressor (22) consumes more power when rotates at higher speed. In view of this point, as well, it is recommended to switch the operation from the cooling and cold thermal energy storage operation to the simple cooling operation if the rotational speed exceeds a predetermined value.

Similarly to the lower reference value R1, the upper reference value R2 is determined from the relationship between the rotational speed and the efficiency of the compressor, a rotational speed of the compressor (22) for storing cold thermal energy, and any other suitable parameters.

In order to store cold thermal energy in the thermal storage section (60), at least a certain amount of cold thermal energy is needed. Thus, in switching the simple cooling operation to the cooling and cold thermal energy storage operation, the rotational speed needs to be increased at least by a value which allows for generation of the certain amount of cold thermal energy.

In this regard, the thermal storage section (60) may be designed to be capable of storing cold thermal energy by utilizing cold thermal energy generated at a lowest rotational speed of the compressor (22). In this case, the simple cooling operation can be switched to the cooling and cold thermal energy storage operation by increasing the rotational speed of the compressor (22) by only the value of the lowest rotational speed of the compressor (22).

[Switching Between Simple Heating Operation and Heating and Warm Thermal Energy Storage Operation]

Switching between the simple heating operation and the heating and warm thermal energy storage operation is performed in a similar manner to the above-described switching between the simple cooling operation and the cooling and cold thermal energy storage operation.

In the simple heating operation, only the indoor air in the indoor heat exchanger (72) is heated, whereas in the heating and warm thermal energy storage operation, both the indoor air in the indoor heat exchanger (72) and the thermal storage medium in the thermal storage heat exchanger (63) are heated. Thus, the high pressure in the refrigeration cycle is temporarily lowered when the simple heating operation is switched to the heating and warm thermal energy storage operation.

On the other hand, in the simple heating operation and the heating and warm thermal energy storage operation, the controller (100) adjusts the rotational speed of the compressor (22) so that the high pressure in the refrigeration cycle (i.e., a pressure of the refrigerant discharged from the compressor) will be a predetermined target value. Thus, when the simple heating operation is switched to the heating and warm thermal energy storage operation, the rotational speed of the compressor (22) needs to be increased to raise the high pressure in the refrigeration cycle to the target value.

To do this, the controller (100) of the present embodiment switches the operation of the thermal storage air conditioner (10) from the simple heating operation to the heating and warm thermal energy storage operation to increase the rotational speed of the compressor (22), if the rotational speed of the compressor (22) is slowed down to the lower reference value R1 in the simple heating operation, and the compressor (22) starts to operate at an inefficient rotational speed. As a result, the rotational speed of the compressor (22) exceeds the lower reference value R1, and the efficiency of the compressor (22) is improved.

Conventionally, if the thermal storage air conditioner (10) has an excessive heating capacity with respect to the heating load of the room even after the rotational speed of the compressor (22) is set to a minimum value Rmin, an on/off operation of the compressor (22), in which the halt and restart of the compressor (22) are repeated, is used to be performed to prevent the room temperature from becoming too high.

On the other hand, the controller (100) of the present embodiment switches the operation of the thermal storage air conditioner (10) from the simple heating operation to the heating and warm thermal energy storage operation, if the rotational speed of the compressor (22) is slowed down to the lower reference value R1 in the simple heating operation. With this control, the room can be heated by utilizing only part of the warm thermal energy obtained by the refrigeration cycle, and the amount of the warm thermal energy used to heat the indoor air in the indoor heat exchanger (72) can be reduced to an appropriate amount for the heating load in the room, while allowing the compressor (22) to keep running. Thus, according to the present embodiment, avoiding the on/off operation of the compressor (22) allows for maintaining the comfort of the room high even in a state in which the heating load of the room is very low.

Now, if the rotational speed of the compressor (22) reaches the upper reference value R2 in the heating and warm thermal energy storage operation, the operation of the thermal storage air conditioner (10) is switched from the heating and warm thermal energy storage operation to the simple heating operation to slow down the rotational speed of the compressor (22).

In FIG. 12, the efficiency of the compressor declines as the rotational frequency exceeds R and approaches Rmax. In such a case, the efficiency of the compressor may be increased if the operation is switched from the heating and warm thermal energy storage operation to the simple heating operation. Further, the compressor (22) consumes more power when rotated at higher speed. In view of this point, as well, it is recommended to switch the operation from the heating and warm thermal energy storage operation to the simple heating operation if the rotational speed exceeds a predetermined value.

Similarly to the case of cooling, the lower reference value R1 and the upper reference value R2 are determined based on the relationship between the rotational speed and the efficiency of the compressor as shown in FIG. 12, a rotational speed of the compressor (22) for storing cold thermal energy, and any other suitable parameter.

In order to store warm thermal energy in the thermal storage section (60), at least a certain amount of warm thermal energy is needed. Thus, in switching the simple heating operation to the heating and warm thermal energy storage operation, the rotational speed needs to be increased at least by a value that allows for generation of the certain amount of warm thermal energy.

In this regard, the thermal storage section (60) may be designed to be capable of storing warm thermal energy by utilizing warm thermal energy generated at a lowest rotational speed of the compressor (22). In this case, the simple heating operation can be switched to the heating and warm thermal energy storage operation by increasing the rotational speed of the compressor (22) by only the value of the lowest rotational speed of the compressor (22).

Variations of Embodiment

In the above-described embodiment, the check valve (CV1) is provided at a portion of the intermediate suction pipe (35) located outside the casing (22a) of the compressor (22). This configuration facilitates the connection and maintenance of the check valve (CV1). The check valve (CV1) may be provided at the inner pipe portion (36) of the intermediate suction pipe (35) located inside the casing (22a). This configuration may achieve a minimum channel length from the compression chamber of the compression mechanism in the middle of the compression process to the check valve (CV1), thereby minimizing a dead volume that does not contribute to the compression of the refrigerant. As a result, decline in the compression efficiency of compressor (22) may be prevented.

First Variant of Embodiment

It is recommended that the thermal energy stored in the thermal storage section (60) during the cooling and cold thermal energy storage operation and the heating and warm thermal energy storage operation in the above-described embodiment be utilized when a cooling load or a heating load of a room is large. In other words, it is desirable that the thermal storage air conditioner (10) performs the utilization cooling operation and/or the utilization heating operations (1) and (2) when the cooling load or the heating load of the room is larger than a predetermined value.

Figure 13:
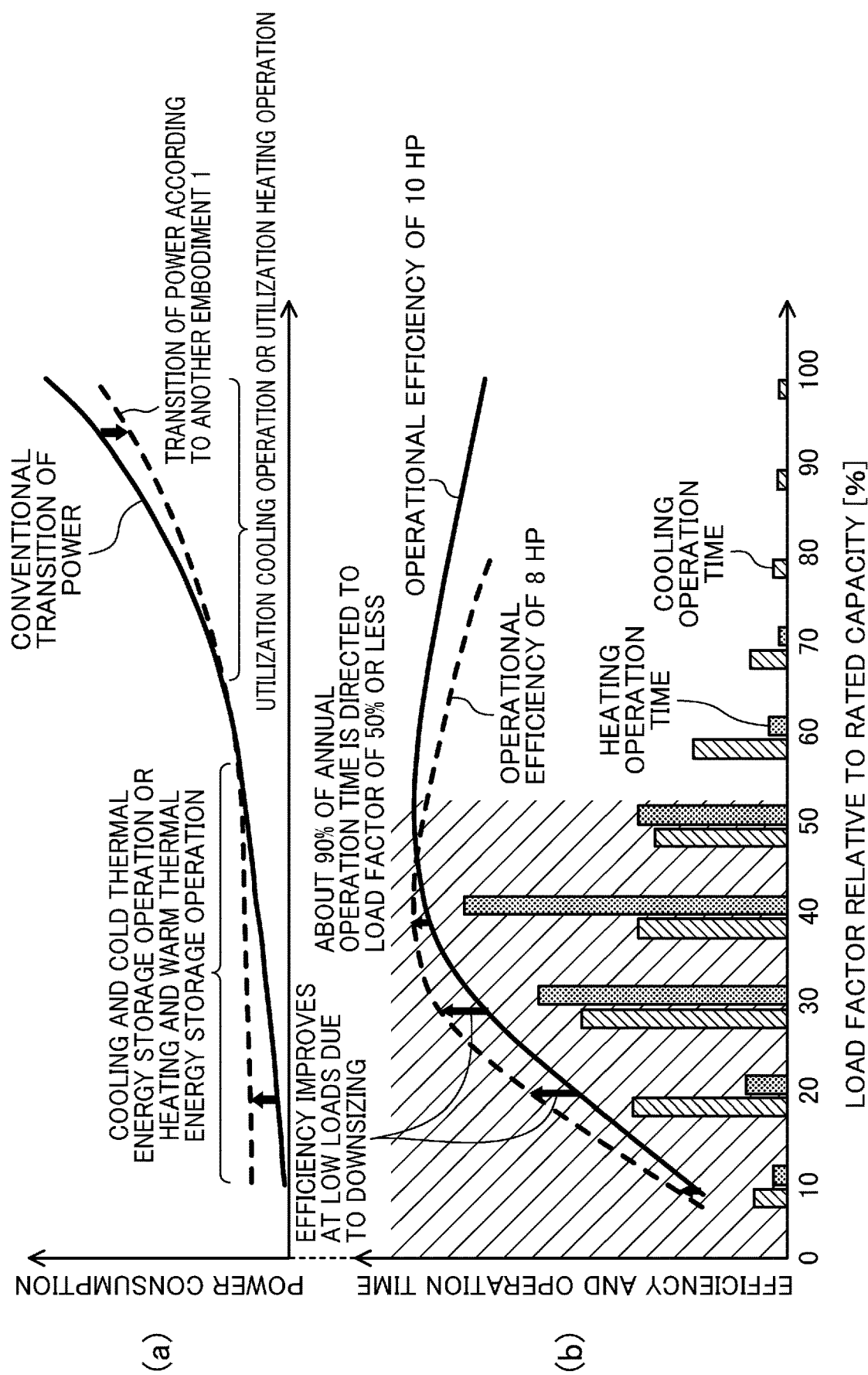
FIG. 13 is a graph for explaining first and second variants of the embodiment, and shows the power consumption, and the efficiency and operation time of the thermal storage air conditioner, with respect to the transition of the load factor relative to a rated capacity.

The broken line in the graph (a) of FIG. 13 shows a transition of the power consumption of the thermal storage air conditioner according to the first variant of the embodiment, and the solid line in the graph (a) shows a transition of the power consumption of a known air conditioner. As clearly shown in the graph (a) of FIG. 13, the thermal storage air conditioner according to the first variant of the embodiment consumes more power at a low load, and less power at a high load, compared to the known air conditioner.

In the first variant of the embodiment, the operation is switched from the simple cooling operation to the cooling and cold thermal energy storage operation when the load is low and the room needs to be cooled, and is switched from the simple heating operation to the heating and warm thermal energy storage operation when the load is low and the room needs to be heated. On the other hand, the known air conditioner continues the simple cooling operation when the load is low and the room needs to be cooled, and continues the simple heating operation when the load is low and the room needs to be heated. This is why, in the graph (a) of FIG. 13, the thermal storage air conditioner of the first variant of the embodiment, in which the cooling and cold thermal energy storage operation or the heating and warm thermal energy storage operation is performed, consumes more power at the low load than in the case where the simple cooling operation or the simple heating operation is performed. As can be seen from this, although more power is consumed than in conventional cases, cold thermal energy or warm thermal energy can be efficiently stored in the first variant of the embodiment.

Further, in the first variant of the embodiment, the utilization cooling operation is performed when the load is high and the room needs to be cooled, and the utilization heating operation is performed when the load is high and the room needs to be heated. On the other hand, the known air conditioner continues the simple cooling operation when the load is high load and when the room needs to be cooled, and continues the simple heating operation when the load is high and the room needs to be heated. This is why, in the graph (a) of FIG. 13, the thermal storage air conditioner of the first variant of the embodiment, in which the utilization cooling operation or the utilization heating operation is performed, consumes less power at the high load than in the case where the simple cooling operation or the simple heating operation is performed.

In view of the power consumption at the low load and the high load, it can be said that the power consumption is smoothed more in the first variant of the embodiment than in conventional cases.

The thermal storage air conditioner (10) according to the first variant of the embodiment may reduce variations in the indoor air temperature to keep the comfort of the room, and reduce power consumption of the air conditioner (10).

It is recommended that the above-mentioned cooling or heating load in the room be determined by the controller (100) based on data of predicted daily temperature transition, a peak temperature value in said data, annual data of temperature transition, etc.

Second Variant of Embodiment

In the graph (b) of FIG. 13, the curves show the efficiency of the thermal storage air conditioner (10) with respect to the transition of load factors with respect to a rated capacity, and the bar charts show operational time of the thermal storage air conditioner (10) with respect to the transition of the load factors with respect to the rated capacity, separately for the heating operation and the cooling operation.

The bar charts in the graph (b) of FIG. 13 reveal that the maximum load factor with respect to the rated capacity is 100% in a cooling operation, but 70% in a heating operation. The bar charts in the graph (b) of FIG. 13 further reveals that in both of the cooling operation and the heating operation, about 90% of the annual operation time is directed to the load factor of 50% or less.

In view of this, in general, the thermal storage air conditioner (10) which can deal with the largest load factor (i.e., 100%) in the cooling operation is selected. However, as shown in the bar charts in the graph (b) of FIG. 13, the length of time in which the load factor is at the maximum (i.e., 100%) is very short, i.e., about several hours a year, even in the cooling operation.

On the other hand, the thermal storage air conditioner (10) according to the above-described first variant of the embodiment may perform the utilization cooling operation when the cooling load in the room is high, and may perform the utilization heating operation when the heating load in the room is high. That is, the thermal storage air conditioner (10) according to the first variant of the embodiment may perform the utilization cooling (or utilization heating) operation to deal with high load factors. Thus, in selecting the thermal storage air conditioner (10) of the first variant of the embodiment, the thermal storage air conditioner (10) smaller in size (i.e., horsepower) than the air conditioners usually selected may be selected. For example, according to the first variant of the embodiment, it is possible to select an 8 horsepower (HP) thermal storage air conditioner which is smaller in size (i.e., horsepower) than a 10 HP thermal storage air conditioner, in a situation in which a 10 HP thermal storage air conditioner is supposed to be selected.

In the graph (b) of FIG. 13, the solid curve shows the transition of the efficiency with respect to the load factor of the 10 HP thermal storage air conditioner, and the broken curve shows the transition of the efficiency with respect to the load factor of the 8 HP thermal storage air conditioner. The comparison between the two curves shows that the thermal storage air conditioner smaller in size (i.e., horsepower) has greater efficiency than the thermal storage air conditioner larger in size (i.e., horsepower) at low loads.

That is, according to the thermal storage air conditioner (10) of the first variant of the embodiment, the efficiency at low loads (at which a large part of operations is performed) is increased, and the annual efficiency may thus be improved, by selecting the thermal storage air conditioner (10) smaller in size (i.e., horsepower) than the usually selected thermal storage air conditioner.

Third Variant of Embodiment

The thermal storage sections of the above embodiments are so-called dynamic thermal storage devices having a thermal storage circuit in which the thermal storage medium is circulated. However, the thermal storage sections may be so-called static thermal storage devices in which water or other thermal storage media retained in a tank, for example, is allowed to exchange heat with a refrigerant.

INDUSTRIAL APPLICABILITY

As can be seen from the foregoing description, the present invention is useful as a thermal storage air conditioner.

DESCRIPTION OF REFERENCE CHARACTERS

10 Thermal Storage Air Conditioner
11 Refrigerant Circuit
22 Compressor (Compression Section)
23 Outdoor Heat Exchanger
28 Suction Pipe (Low-Pressure Suction Portion)
31 First Introduction Pipe (Low-Pressure Introduction Pipe)
32 First Subcooling Heat Exchanger (First Heat Exchanger)
35 Intermediate Suction Pipe (Intermediate Suction Portion)
36 Inner Pipe Portion
44 Primary Thermal Storage Channel
60 Thermal Storage Section (Thermal Storage Device)
61 Thermal Storage Circuit
62 Thermal Storage Tank
63 Thermal Storage Heat Exchanger
65 Outflow Pipe (Outflow Portion)
72 Indoor Heat Exchanger
100 Controller (Operation Control Section)
EV1 First Decompression Valve (Decompression Valve)

The invention claimed is:

1. A thermal storage air conditioner, comprising:
a refrigerant circuit which has a compressor, an outdoor heat exchanger, and an indoor heat exchanger and performs a refrigeration cycle;
a thermal storage section which has a thermal storage medium and exchanges heat between the thermal storage medium and a refrigerant of the refrigerant circuit; and
a controller configured to
control the refrigerant circuit such that the thermal storage air conditioner performs a simple cooling operation in which in the refrigerant circuit, the refrigerant is condensed in the outdoor heat exchanger and evaporates in the indoor heat exchanger; and a cooling and cold thermal energy storage operation in which in the refrigerant circuit, the refrigerant is condensed in the outdoor heat exchanger and evaporates in the indoor heat exchanger, and in which the thermal storage medium in the thermal storage section is cooled by the refrigerant; and
switch, if a rotational speed of the compressor is slowed down to a predetermined lower reference value during the simple cooling operation, operation of the thermal storage air conditioner from the simple cooling operation to the cooling and cold thermal energy storage operation to increase the rotational speed of the compressor.

2. The thermal storage air conditioner of claim 1, wherein the controller is further configured to switch the operation of the thermal storage air conditioner from the cooling and cold thermal energy storage operation to the simple cooling operation to reduce the rotational speed of the compressor if the rotational speed of the compressor increases to a predetermined upper reference value during the cooling and cold thermal energy storage operation.

3. The thermal storage air conditioner of claim 1, wherein when the controller switches the operation of the thermal storage air conditioner from the simple cooling operation to the cooling and cold thermal energy storage operation, the rotational speed of the compressor is increased by a value equal to a lowest rotational speed of the compressor.

4. The thermal storage air conditioner of claim 2, wherein when the controller switches the operation of the thermal storage air conditioner from the simple cooling operation to the cooling and cold thermal energy storage operation, the rotational speed of the compressor is increased by a value equal to a lowest rotational speed of the compressor.

* * * * *